US007673334B2

(12) United States Patent
Takemori et al.

(10) Patent No.: US 7,673,334 B2
(45) Date of Patent: Mar. 2, 2010

(54) COMMUNICATION SYSTEM AND SECURITY ASSURANCE DEVICE

(75) Inventors: Keisuke Takemori, Kamifukuoka (JP); Yutaka Miyake, Kamifukuoka (JP); Toshiaki Tanaka, Kamifukuoka (JP); Takamasa Isohara, Tokyo (JP); Iwao Sasase, Yokohama (JP)

(73) Assignees: KDDI Corporation, Tokyo (JP); KEIO University, Tokyo (JP)

( * ) Notice: Subject to any disclaimer, the term of this patent is extended or adjusted under 35 U.S.C. 154(b) by 1193 days.

(21) Appl. No.: 11/212,442

(22) Filed: Aug. 26, 2005

(65) Prior Publication Data

US 2006/0048228 A1    Mar. 2, 2006

(30) Foreign Application Priority Data

Aug. 30, 2004 (JP) .................... P2004-249983
Oct. 15, 2004 (JP) .................... P2004-301902
Mar. 17, 2005 (JP) .................... P2005-077247

(51) Int. Cl.
G06F 7/04      (2006.01)
G06F 15/16     (2006.01)
G06F 17/30     (2006.01)
H04L 29/06     (2006.01)

(52) U.S. Cl. .................... 726/10; 726/22; 713/166
(58) Field of Classification Search ........... 726/10, 726/22, 23, 24, 25; 713/166
See application file for complete search history.

(56) References Cited

U.S. PATENT DOCUMENTS 5,530,758 A * 6/1996 Marino et al. ............... 713/150
5,850,451 A * 12/1998 Sudia ......................... 380/286
5,987,440 A * 11/1999 O'Neil et al. ................ 705/44
6,195,366 B1 * 2/2001 Kayashima et al. ......... 370/475
6,550,012 B1 * 4/2003 Villa et al. .................. 726/11
6,775,536 B1 * 8/2004 Geiger et al. ............... 455/411
6,807,636 B2 * 10/2004 Hartman et al. ............. 726/14
7,039,802 B1 * 5/2006 Eskicioglu et al. .......... 713/156
7,058,970 B2 * 6/2006 Shaw .......................... 726/6

(Continued)

OTHER PUBLICATIONS

Adams, Carlisle et al., "Understanding Public-Key Infrastructure: Concepts, Standards, and Deployment Considerations," Macmillan Technical Pub. (1999).

(Continued)

*Primary Examiner*—David Garcia Cervetti
(74) *Attorney, Agent, or Firm*—David G. Conlin; Steven M. Jensen; Edwards Angell Palmer & Dodge LLP

(57) ABSTRACT

A communication system and a security assurance device are proposed, which are capable of assuring that a target party for communication is implementing security countermeasures. A server 3 transmits information 104 necessary for AC issuance to a security assurance authority 2. The security assurance authority 2 verifies the security of the server 3 during communication based upon this information necessary for AC issuance 104. And, when the security of the server 3 during communication is confirmed, the security assurance authority 2 issues an AC 105 which proves the security of the server 3 during communication, and transmits it to the server 3. Upon receipt of this AC 105, the server 3 transmits the AC 105 to a client 4, according to a connection request from the client 4. And, upon receipt of this AC 105, the client 4 verifies the security during communication of the server 3, based upon the AC 105.

39 Claims, 22 Drawing Sheets

U.S. PATENT DOCUMENTS

| | | | |
|---|---|---|---|
| 7,069,438 B2* | 6/2006 | Balabine et al. | 713/168 |
| 7,162,525 B2* | 1/2007 | Cofta et al. | 709/228 |
| 7,165,174 B1* | 1/2007 | Ginter et al. | 713/153 |
| 7,191,252 B2* | 3/2007 | Redlich et al. | 709/246 |
| 7,219,154 B2* | 5/2007 | Blakley et al. | 709/229 |
| 7,299,356 B2* | 11/2007 | Mizrah | 713/169 |
| 7,305,704 B2* | 12/2007 | Ofek et al. | 726/15 |
| 7,343,619 B2* | 3/2008 | Ofek et al. | 726/2 |
| 7,346,923 B2* | 3/2008 | Atkins et al. | 726/6 |
| 7,367,045 B2* | 4/2008 | Ofek et al. | 726/2 |
| 7,370,351 B1* | 5/2008 | Ramachandran et al. | 726/8 |
| 7,467,303 B2* | 12/2008 | Keohane et al. | 713/185 |
| 7,562,382 B2* | 7/2009 | Hinton et al. | 726/2 |
| 2001/0054143 A1* | 12/2001 | Miyazawa et al. | 713/155 |
| 2002/0025046 A1* | 2/2002 | Lin | 380/282 |
| 2002/0053020 A1* | 5/2002 | Teijido et al. | 713/153 |
| 2003/0028639 A1* | 2/2003 | Yamamoto et al. | 709/225 |
| 2003/0046391 A1* | 3/2003 | Moreh et al. | 709/225 |
| 2003/0051054 A1* | 3/2003 | Redlich et al. | 709/246 |
| 2003/0097557 A1* | 5/2003 | Tarquini et al. | 713/153 |
| 2003/0115483 A1* | 6/2003 | Liang | 713/201 |
| 2003/0154401 A1* | 8/2003 | Hartman et al. | 713/201 |
| 2003/0163728 A1* | 8/2003 | Shaw | 713/201 |
| 2003/0177374 A1* | 9/2003 | Yung et al. | 713/189 |
| 2003/0177381 A1* | 9/2003 | Ofek et al. | 713/200 |
| 2003/0177382 A1* | 9/2003 | Ofek et al. | 713/200 |
| 2003/0177383 A1* | 9/2003 | Ofek et al. | 713/200 |
| 2004/0128392 A1* | 7/2004 | Blakley et al. | 709/229 |
| 2004/0128393 A1* | 7/2004 | Blakley et al. | 709/229 |
| 2004/0128506 A1* | 7/2004 | Blakley et al. | 713/170 |
| 2004/0128541 A1* | 7/2004 | Blakley et al. | 713/201 |
| 2004/0128542 A1* | 7/2004 | Blakley et al. | 713/201 |
| 2004/0128546 A1* | 7/2004 | Blakley et al. | 713/201 |
| 2004/0199924 A1* | 10/2004 | Ganesh et al. | 719/313 |
| 2004/0230799 A1* | 11/2004 | Davis | 713/169 |
| 2004/0259640 A1* | 12/2004 | Gentles et al. | 463/42 |
| 2005/0005097 A1* | 1/2005 | Murakawa | 713/156 |
| 2005/0050328 A1* | 3/2005 | Mizrah | 713/171 |
| 2005/0154886 A1* | 7/2005 | Birk et al. | 713/168 |
| 2005/0193201 A1* | 9/2005 | Rahman et al. | 713/169 |
| 2005/0216733 A1* | 9/2005 | Keohane et al. | 713/156 |
| 2005/0240760 A1* | 10/2005 | Zhang | 713/157 |
| 2006/0020679 A1* | 1/2006 | Hinton et al. | 709/217 |
| 2006/0020784 A1* | 1/2006 | Jonker et al. | 713/157 |
| 2006/0021017 A1* | 1/2006 | Hinton et al. | 726/10 |
| 2006/0021018 A1* | 1/2006 | Hinton et al. | 726/10 |
| 2006/0021019 A1* | 1/2006 | Hinton et al. | 726/10 |
| 2006/0048216 A1* | 3/2006 | Hinton et al. | 726/8 |
| 2006/0106836 A1* | 5/2006 | Masugi et al. | 707/101 |
| 2006/0174323 A1* | 8/2006 | Brown et al. | 726/3 |
| 2007/0174627 A1* | 7/2007 | Teijido et al. | 713/182 |
| 2008/0104687 A1* | 5/2008 | Fujiwara et al. | 726/10 |

OTHER PUBLICATIONS

"Information Technology—Open Systems Interconnection—The Directory Authentication Framework," ITU-T Recommendation x.509, Jun. 1997 (equivalent to ISO/IEC 9594) (1997).

"Internet X.509 Public Key Infrastructure Certificate and CRL Profile," IETF, RFC2459 (1999).

"An Internet Attribute Certificate Profile for Authorization," IETF, RFC3281 (2002).

Takeda, Keiji et al., "Network Intrusion Detection," Softbank Publishing (Jun. 2000).

"Overall Chart for Up-to-date Understanding of Computer Viruses," Atomic Drop, Gijutsu-Hyohron Co., Ltd. (Oct. 2000).

* cited by examiner

FIG. 4A

SECURITY ASSURANCE CHECK

ASSURANCE BY XXX CERTIFICATE AUTHORITY OF SECURITY LEVEL OF THIS SITE:

| | |
|---|---|
| IDS | VALID |
| VDS | VALID |

CONTINUE COMMUNICATION ?

[ YES ] [ NO ] [ DISPLAY CERTIFICATE ]

FIG. 4B

DETAILED INFORMATION IN CERTIFICATE

[SECURITY ASSURANCE INFORMATION]

| | |
|---|---|
| DESTINATION OF ISSUANCEYYY SITE.COM | YYYsite.com |
| ISSUERXXX ASSURANCE AUTHORITY | XXXCA |
| DAY OF ISSUANCE | 2004/08/01 |
| LONGEST PERIOD OF VALIDITY | 2004/08/31 |
| IDS | Networks-IDS |
| IDS VERSION | Ver 2.3 |
| IDS PATTERN FILE | 201 |
| IDS PATTERN FILE DATE OF ISSUANCE | 2004/07/21 |
| VDS | Cyber-VDS |
| VDS VERSION | Ver 2004 |
| VDS PATTERN FILE | 308 |
| VDS PATTERN FILE DATE OF ISSUANCE | 2004/07/27 |

[CERTIFICATE ALGORITHM]

| | |
|---|---|
| VERSION | V3 |
| SERIAL NUMBER | 61 37 9f 00 00 00 02 |
| SIGNATURE ALGORITHM | sha1RSA |
| PUBLIC KEY | RSA(1024bit) |
| THUMBPRINT ALGORITHM | sha1 |
| THUMBPRINT | 76 2b a4 17 47 7d 00 f3 |
| SIGNATURE PASSWORDZZZ | |
| AUTHENTICATION AUTHORITY | ZZZCA |

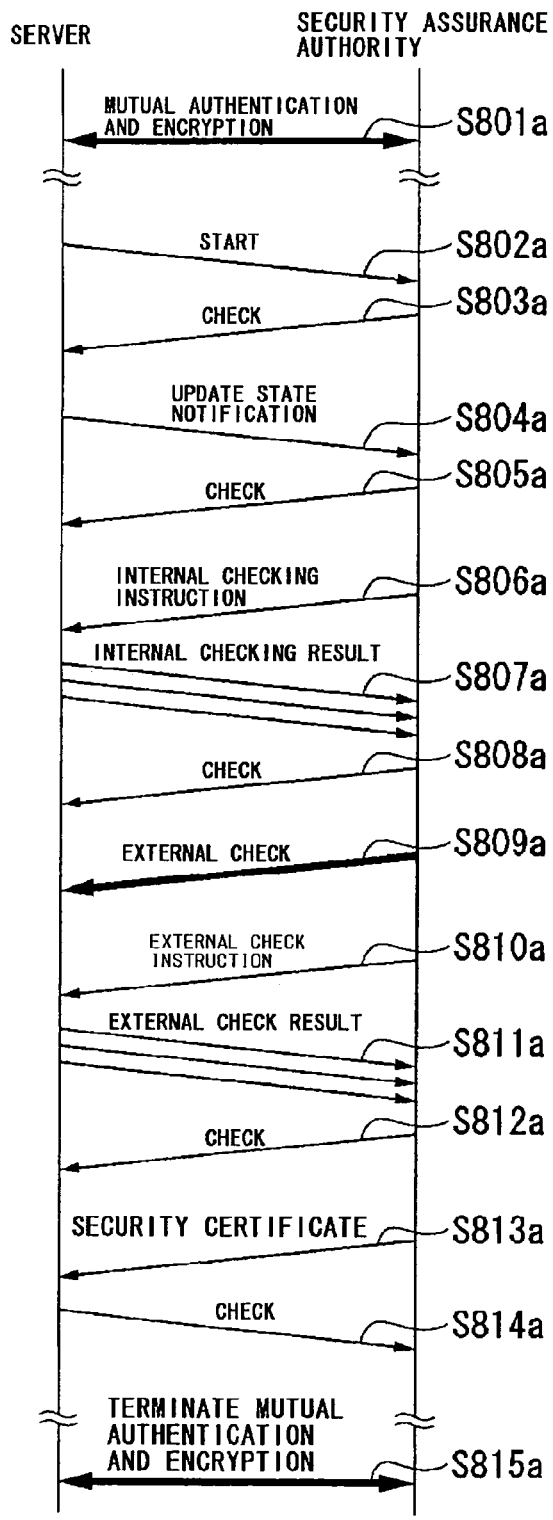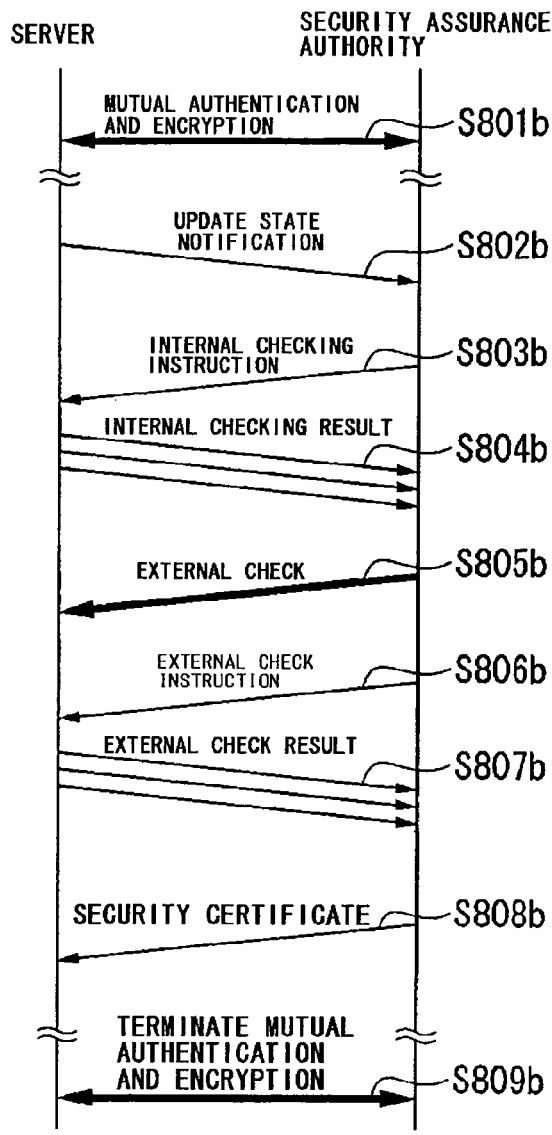
FIG. 8A
FIG. 8B

FIG. 9

START PACKET

```
<type>start</type>
<source-ip>192.168.10.1</source-ip> *
```

CHECK PACKET

```
<type>start-ack</type>
<sca-ip>192.168.0.1</sca-ip> *
```

FIG. 10

UPDATE STATE NOTIFICATION PACKET

```
<type>status</type>
<source-ip>192.168.10.1</source-ip> *
<status-os>name:redhat linux,
          version:2.5.2,
          patch:rpm-test</status-os>
<status-ids>name:snort,
           version:2.0.29
           pattern:UP:web-iis</status-ids>
<pub-key>fo2038nscl20t6faow3pfda</pub-key>
```

CHECK PACKET

```
<type>status-ack</type>
<sca-ip>192.168.0.1</sca-ip> *
```

FIG. 11

INTERNAL CHECKING INSTRUCTION PACKET

```
<type>incheck-req</type>
<sca-ip>192.168.0.1</sca-ip> *
<incheck-req-os>syslog,
            ps</incheck-req-os>
```

INTERNAL CHECKING RESULT PACKET

```
<type>incheck-res</type>
<source-ip>192.168.10.1</source-ip> *
<incheck-res-os>text1,
            test2</incheck-res>
```

CHECK PACKET

```
<type>incheck-ack</type>
<sca-ip>192.168.0.1</sca-ip>*
```

FIG. 12

EXTERNAL CHECK INSTRUCTION PACKET

```
<type>outcheck-req</type>
<sca-ip>192.168.0.1</sca-ip> *
<check-ip>192.168.20.1</check-ip>
<time>gmt2005,01,04,18,00,30</time>
<outcheck-req-ids>log
  </outcheck-req-os>
```

EXTERNAL CHECK RESULT PACKET

```
<type>outcheck-res</type>
<source-ip>192.168.10.1</source-ip> *
<outcheck-res-ids>text1,
      test2</outcheck-res-ids>
```

CHECK PACKET

```
<type>outcheck-ack</type>
<sca-ip>192.168.0.1</sca-ip> *
```

FIG. 13

SECURITY CERTIFICATE PACKET

```
<type>certification</type>
<sca-ip>192.168.0.1</sca-ip> *
<scaname>sca.test.jp</scaname>
<version>2.1</version>
<id>A-002</id> *
<sig-type>sha-1</sig-type>
<start-time>gmt2005.01.04.18.01.00</start-time>
<valid-term>1week<valid-term>
<server-name>server.test.jp</server-name>
<pub-key>fo2038nscl20t6faow3pfda</pub-key>
<level>3</level>
<os-status>OK</os-status> *
<ids-status>OK</ids-status> *
<secret-os>sl3fsdp204jgjeo48jl10dsizmc</secret-os>*
<secret-ids>weon839nscq01soxjiwe8few</secret-ids>*
<hash>sl3fsdp204jgjeo48jl10ds.zmc</hash>
```

UNFINISHED COUNTERMEASURE NOTIFICATION PACKET

```
<type>error-certification</type>
<sca-ip>192.168.0.1</sca-ip> *
<error-os>version</error-os>
<error-ids>pattern</error-ids>
```

FIG. 14A

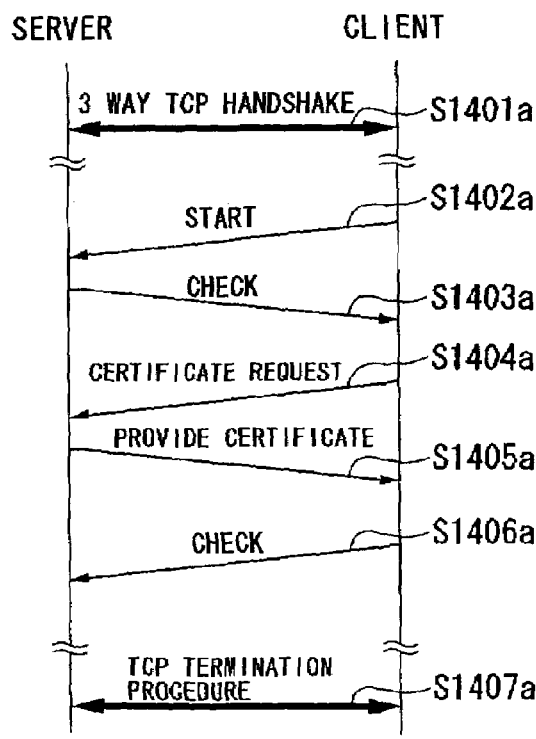

FIG. 14B

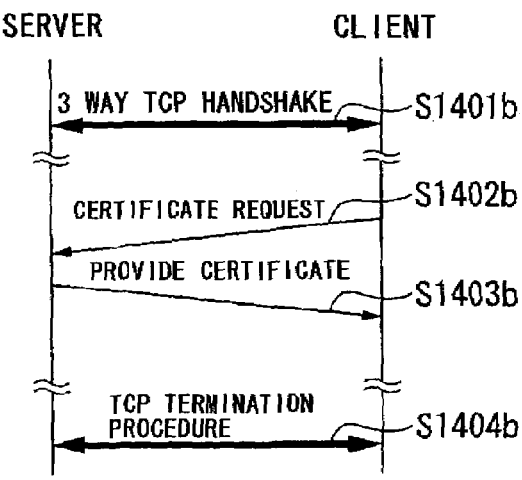

FIG. 15

CERTIFICATE REQUEST PACKET

\<type\>request-certification\</type\>

SECURITY CERTIFICATE PACKET

\<type\>certification\</type\>
\<sca-ip\>192.168.0.1\</sca-ip\> *
\<scaname\>sca.test.jp\</scaname\>
\<version\>2.1\</version\>
\<id\>A-002\</id\> *
\<sig-type\>sha-1\</sig-type\>
\<start-time\>gmt2005.01.04.18,01,00\</start-time\>
\<valid-term\>1week\</valid-term\>
\<server-name\>server.test.jp\</server-name\>
\<pub-key\>fo2038nscl20t6faow3pfda\</pub-key\>
\<level\>3\</level\>
\<os-status\>OK\</os-status\> *
\<ids-status\>OK\</ids-status\> *
\<secret-os\>sl3fsdp204jgjeo48jl10dsizmc\</secret-os\>*
\<secret-ids\>weon839nsoq01soxjiwe8few\</secret-ids\>*
\<hash\>sl3fsdp204jgjeo48jl10ds.zmc\</hash\>

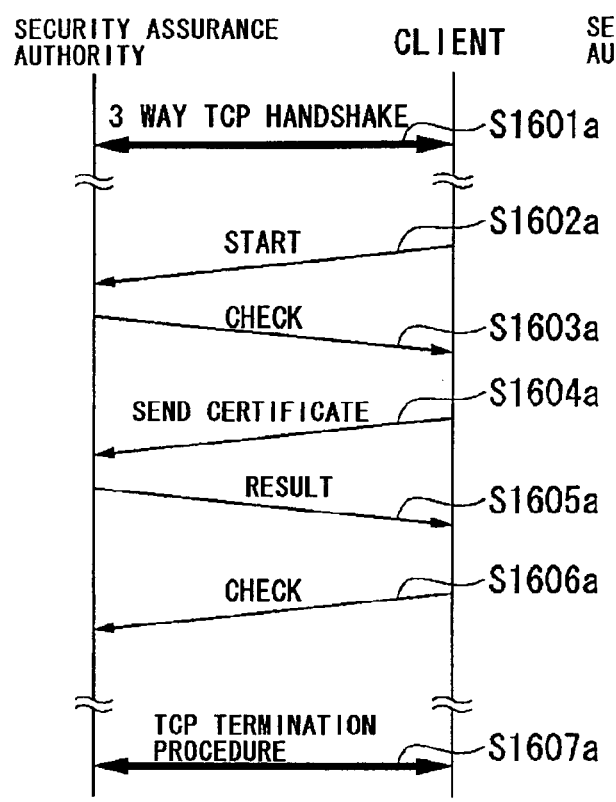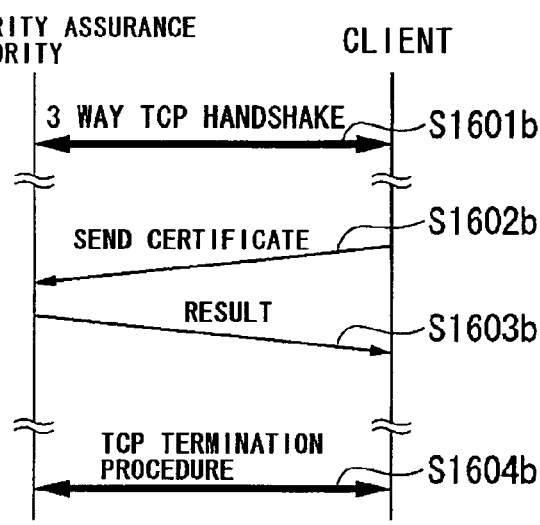
FIG. 16A
FIG. 16B

FIG. 17

SECURITY CERTIFICATE PACKET

```
<type>crlcheck</type>
<sca-ip>192.168.0.1</sca-ip> *
<scaname>sca.test.jp</scaname>
<version>2.1</version>
<id>A-002</id> *
<sig-type>sha-1</sig-type>
<start-time>gmt2005.01.04.18,01,00</start-time>
<valid-term>1week</valid-term>
<server-name>server.test.jp</server-name>
<pub-key>fo2038nscl20t6faow3pfda</pub-key>
<level>3</level>
<os-status>OK</os-status> *
<ids-status>OK</ids-status> *
<secret-os>sl3fsdp204jgjeo48jl10dsizmc</secret-os>*
<secret-ids>weon839nsoq01soxjiwe8few</secret-ids>*
<hash>sl3fsdp204jgjeo48jl10ds.zmc</hash>
```

RESULT PACKET

```
<type>crlresult</type>
<sca-ip>192.168.0.1</sca-ip> *
<os-result>OK</os-result>
<ids-result>OK</ids-result>
<hash-sca>22nmiw38oajf20fshu</hash-sca>
```

FIG. 19

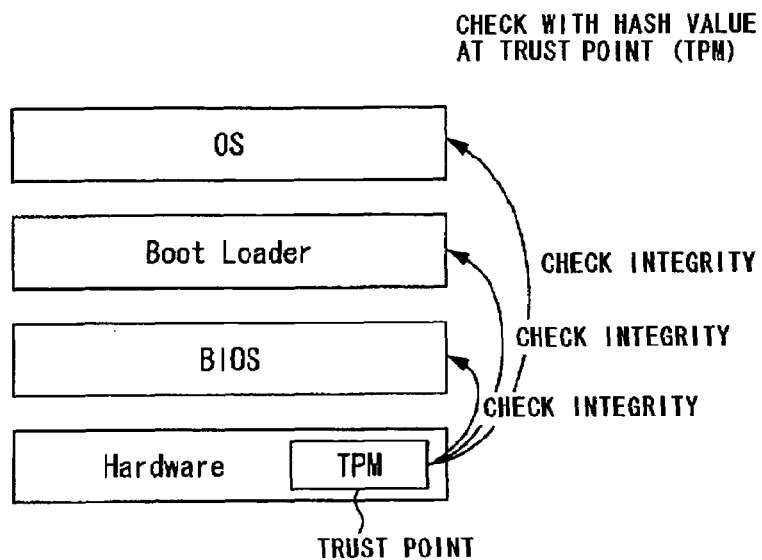

FIG. 20A

| INFORMATION WHICH SHOULD BE PROTECTED (WITHIN SECURITY CHIP) | INFORMATION WHICH IS PROTECTED (NORMAL MEMORY REGION) |
|---|---|
| ● BIOS, Boot Loader, OS<br>●FUNCTION OF CREATING PUBLIC KEY AND SECRET KEY<br>●SECRET KEY<br>●INTERNAL CHECKING MODULE<br>●COMMUNICATION INTERFACE | ●BATCH FILE OF OS<br>●IDS/VDS<br>●PATTERN FILE OF IDS/VDS<br>●SECURITY CERTIFICATE<br>●VARIOUS TYPES OF APPLICATION |

FIG. 20B

| INFORMATION WHICH SHOULD BE PROTECTED (WITHIN SECURITY CHIP) | INFORMATION WHICH IS PROTECTED (NORMAL MEMORY REGION) |
|---|---|
| ●HASH VALUE OF OS, BIOS AND BOOT LOADER<br>●FUNCTION OF CREATING PUBLIC KEY AND SECRET KEY<br>●SECRET KEY<br>●HASH VALUE OF INTERNAL CHECKING MODULE<br>●HASH VALUE OF COMMUNICATION INTERFACE | ●BIOS, BOOT LOADER, OS<br>●BATCH FILE OF OS<br>●IDS/VDS<br>●PATTERN FILE OF IDS/VDS<br>●INTERNAL CHECKING MODULE<br>●COMMUNICATION INTERFACE<br>●SECURITY CERTIFICATE<br>●VARIOUS TYPES OF APPLICATION |

FIG. 24

X.509 Ver.2
CRL: Certificate Revocation List

| VERSION NUMBER |||
|---|---|---|
| SIGNATURE METHOD |||
| NAME OF ISSUER |||
| DAY OF UPDATING |||
| DAY OF NEXT UPDATE (OPTION) |||
| ABROGATED CERTIFICATE INFORMATION |||
| SERIAL NUMBER | DATE AND TIME OF ERASURE | ENTRY EXTENDED FIELD ((OPTION) |
| SERIAL NUMBER | DATE AND TIME OF ERASURE | ENTRY EXTENDED FIELD ((OPTION) |
| . . . |||
| EXTENDED REGION (OPTION) |||
| SIGNATURE |||

COMMUNICATION SYSTEM AND SECURITY ASSURANCE DEVICE

BACKGROUND OF THE INVENTION

1. Field of the Invention

The present invention relates to a communication system and to a security assurance device, which are capable of assuring an appropriate level of security during communication with an opposite party.

Priority is claimed on Japanese Patent Application No. 2004-249983, filed Aug. 30, 2004, Japanese Patent Application No. 2004-301902, filed Oct. 15, 2004 and Japanese Patent Application No. 2005-77247, filed Mar. 17, 2005, the content of which are incorporated herein by reference.

2. Description of Related Art

A PKI (Public Key Infrastructure) is an infrastructure technique for authentication during communication with an opposite party over the currently existing internet (for example, refer to "Understanding Public-Key Infrastructure: Concepts, Standards, and Deployment Considerations" by Carlisle Adams and Steve Lloyd, from Macmillan Technical Pub, 1999), and it is a technique in which a CA (Certificate Authority or authentication authority) which is trusted upon the social level guarantees the public key of a host which has generated a pair of keys consisting of a public key and a secret key, i.e. guarantees that the host really and certainly did generate that public key. In PKI, a CA which is socially trusted, issues a public key certificate (PKC: Public Key Certificate) upon which a digital signature (of certificate issuance) has been encrypted by applying its own secret key, for the public key in a pair, consisting of a public key and a secret key, which has been generated by the target party for communication (here this party will be termed the server). The receiving side of the communication (here this party is termed the client), in order to check the PKC which has been sent from the target party for communication and which has arrived, verifies the digital signature of the PKC using the public key of the CA, and thereby authenticates the correct identity (the recognizability) of the target party for communication.

The CA receives a public key from the server, which has created a pair of that public key and a secret key, and, after having authenticating the identity of that server off-line, thereafter issues certificate which include that public key. Here by issuance means the procedure of affixing, with the secret key of the CA itself, a digital signature to the entire body of information, including the public key of the server and collateral information. As a representative example of such a certificate, an X.509 certificate may be cited (for example, refer to "Information Technology—Open Systems Interconnection—The Directory Authentication Framework", ITU-T Recommendation X.509, June 1997 (equivalent to ISO/IEC 9594, 1997), "Internet X.509 Public Key Infrastructure Certificate and CRL Profile", IETF, RFC2459, 1999. and "An Internet Attribute Certificate Profile for Authorization", IETF, RFC3281, 2002.).

This certificate can be a PKC for certificating the identity and an AC (Attribute Certificate) for certificating attributes which have been linked to the PKC (refer to FIG. 22). It is possible to append attribute information in an extended field of the PKC, or of the AC, including the purpose of using the information and information concerning the owner of the public key, or the like. However, if the attribute is frequently updated, an AC comes to be used, since the updating cost for the PKC becomes a problem. Although the PKC is issued and managed by a CA which is trusted, an AC may be issued and managed by a local AA (Attribute Authority).

FIG. 23 shows the issuance and specification relationship for a PKC and an AC by a CA and an AA. Upon a request from a terminal (EE) 7, a certification authority (CA) 1 issues a public key certificate (PKC) 100 for the terminal 7. In addition, an attribute authentication authority (AA) 6 issues an attribute certificate (AC) 101 which has been linked to the public key certificate of the terminal 7.

It may happen that, due to some reason, it is necessary to revoke the PKC, even though the signature of the PKC is correct and it is before its expiration. PKCs which have been revoked are recorded in a CRL (Certificate Revocation List). The format of such a CRL is shown in FIG. 24.

In a communication system, as systems for enhancing the security of the communication system against attack such as virus attacks and the like, there are per se known an IDS (Intrusion Detection System) and a VDS (Virus Detection System). An IDS is a system which monitors packets which flow upon the network or a log file upon a host, and which alarms if it detects a packet or a log file which matches with an attack pattern file. FIG. 25 shows a model of a network type IDS which monitors packets upon a network, and which watches for improper behavior (for example, refer to "Network intrusion detection" by Keiji Takeda and Hiroshi Isozaki, from Softbank Publishing, June 2000).

In this figure, an IDS 8 monitors packets 200 which flow between a network 11a and a network 11b. In this IDS 8, a packet acquisition section 81 acquires a packet 200 and outputs it to an attack detection section 82. The attack detection section 82 makes a decision, based upon attack patterns which are recorded in an attack pattern file 300, as to whether or not this packet which has been acquired is one which constitutes an attack; and, if it has been decided that this packet is indeed one which constitutes an attack, then, along with recording in a log 301, executes processes such as issuing an alarm or the like.

On the other hand, a VDS is a system which outputs an alarm when it detects code within a file upon the host, or within a file which has been sent or received upon the network, which matches with a pattern file of computer viruses (for example, refer to "Overall Chart for Up-to-date Understanding of Computer Viruses", Atomic Drop, Gijutsu-Hyohron Co., Ltd, October 2000.). Generally a VDS is provided within a client host or server or network GW (gateway).

However, with a prior art communication system, while it has been possible to authenticate the correct identity of the target party of communication, the security level of this communication has not been guaranteed. Accordingly there has been the problematical point that, if the server of the target party of communication is a malicious server, or a server which has not taken security countermeasures, then the client side may also be attacked.

The present invention has been made in the light of the above described problematical point, and it takes as its objective to provide a communication system, and a security assurance device, which can assure whether or not the target party of communication is implementing security countermeasures.

SUMMARY OF THE INVENTION

The first aspect of the present invention is a communication system including the first communication device, the second communication device which performs communication with the first communication device, and a security assurance device which assures security during communication with the second communication device, wherein: the second communication device transmits notification information for notifying its own security during communication to the security assurance device; the security assurance device receives the notification information, verifies the security of the second communication device during communication device based upon the notification information, and, if it has checked the security during communication, generates security certification information which certificates the security during communication and transmits it to the second communication device; the second communication device receives the security certification information, and transmits the security certification information to the first communication device according to a connection request from the first communication device; and the first communication device, after the connection request to the second communication device, receives the security certification information from the first communication device, and verifies the security during communication with the second communication device based upon the security certification information.

The second aspect of the present invention is a communication system, including the first communication device, the second communication device which performs communication with the first communication device, and a security assurance device which assures security during communication with the second communication device, wherein: the second communication device transmits security certification information which proves its own security during communication to the security assurance device; the security assurance device receives the security certification information, appends signature information to the security certification information, and transmits the security certification information to the second communication device; the second communication device receives the security certification information, and transmits the security certification information with the signature appended to the first communication device according to a connection request from the first communication device; and the first communication device receives, after the connection request to the second communication device, the security certification information from the second communication device, and verifies the security during communication with the second communication device based upon the security certification information, and the signature information which has been appended to the security certification information.

The third aspect of the present invention is a security assurance device in a communication system which includes the first communication device, and the second communication device which performs communication with the first communication device according to a connection request from the first communication device, the security assurance device assuring security during communication with the second communication device and including: a reception means which receives notification information that has been transmitted from the second communication device, and which indicates the security during communication with the second communication device; a verification means which verifies the security during communication with the second communication device based upon the notification information; an certification information generation means which generates, if the security during communication with the second communication device is confirmed by the verification means, security certification information which certificates the security during communication; and a transmission means which transmits the security certification information to the second communication device.

The fourth aspect of the present invention is a security assurance device in a communication system which includes the first communication device, and the second communication device which performs communication with the first communication device according to a connection request from the first communication device, and a security assurance device assuring security during communication with the second communication device, and including: a reception means which receives security certification information which is transmitted form the second communication device, and which indicates the security during communication with the second communication device; a signature information appending means which appends signature information to the security certification information; and a transmission means which transmits the security certification information with the signature information which is appended, to the second communication device.

Since, according to the present invention, it is arranged for the security assurance device to prove the security while the first communication device communicates with the second communication device, accordingly the beneficial effect is obtained that it is possible to be assured that the target party of communication is implementing security countermeasures.

BRIEF DESCRIPTION OF THE DRAWINGS

FIG. 4A is a reference figure showing a display for checking the contents of an attribute certificate according to the embodiment of the present invention.

FIG. 4B is a reference figure showing a display for checking the contents of an attribute certificate according to the embodiment of the present invention.

FIG. 8A is a sequence diagram showing a communication sequence in another variant example of the embodiment of the present invention.

FIG. 8B is a sequence diagram showing a communication sequence in another variant example of the embodiment of the present invention.

FIG. 9 is a reference figure showing the contents of a packet in another variant example of the embodiment of the present invention.

FIG. 10 is a reference figure showing the contents of a packet in another variant example of the embodiment of the present invention.

FIG. 11 is a reference figure showing the contents of a packet in another variant example of the embodiment of the present invention.

FIG. 12 is a reference figure showing the contents of a packet in another variant example of the embodiment of the present invention.

FIG. 13 is a reference figure showing the contents of a packet in another variant example of the embodiment of the present invention.

FIG. 14A is a sequence diagram showing a communication sequence in another variant example of the embodiment of the present invention.

FIG. 14B is a sequence diagram showing a communication sequence in another variant example of the embodiment of the present invention.

FIG. 15 is a reference figure showing the contents of a packet in another variant example of the embodiment of the present invention.

FIG. 16A is a sequence diagram showing a communication sequence in another variant example of the embodiment of the present invention.

FIG. 16B is a sequence diagram showing a communication sequence in another variant example of the embodiment of the present invention.

FIG. 17 is a reference figure showing the contents of a packet in another variant example of the embodiment of the present invention.

FIG. 19 is a reference figure for explanation of anti-tampering action of an internal checking module in another variant example of the embodiment of the present invention.

FIG. 20A is a reference figure for explanation of information which should be protected and information which is protected, in another variant example of the embodiment of the present invention.

FIG. 20B is a reference figure for explanation of information which should be protected and information which is protected, in another variant example of the embodiment of the present invention.

FIG. 24 is a reference figure showing the data structure of an certificate revocation list according to the related art.

DETAILED DESCRIPTION OF THE INVENTION

Figure 1:
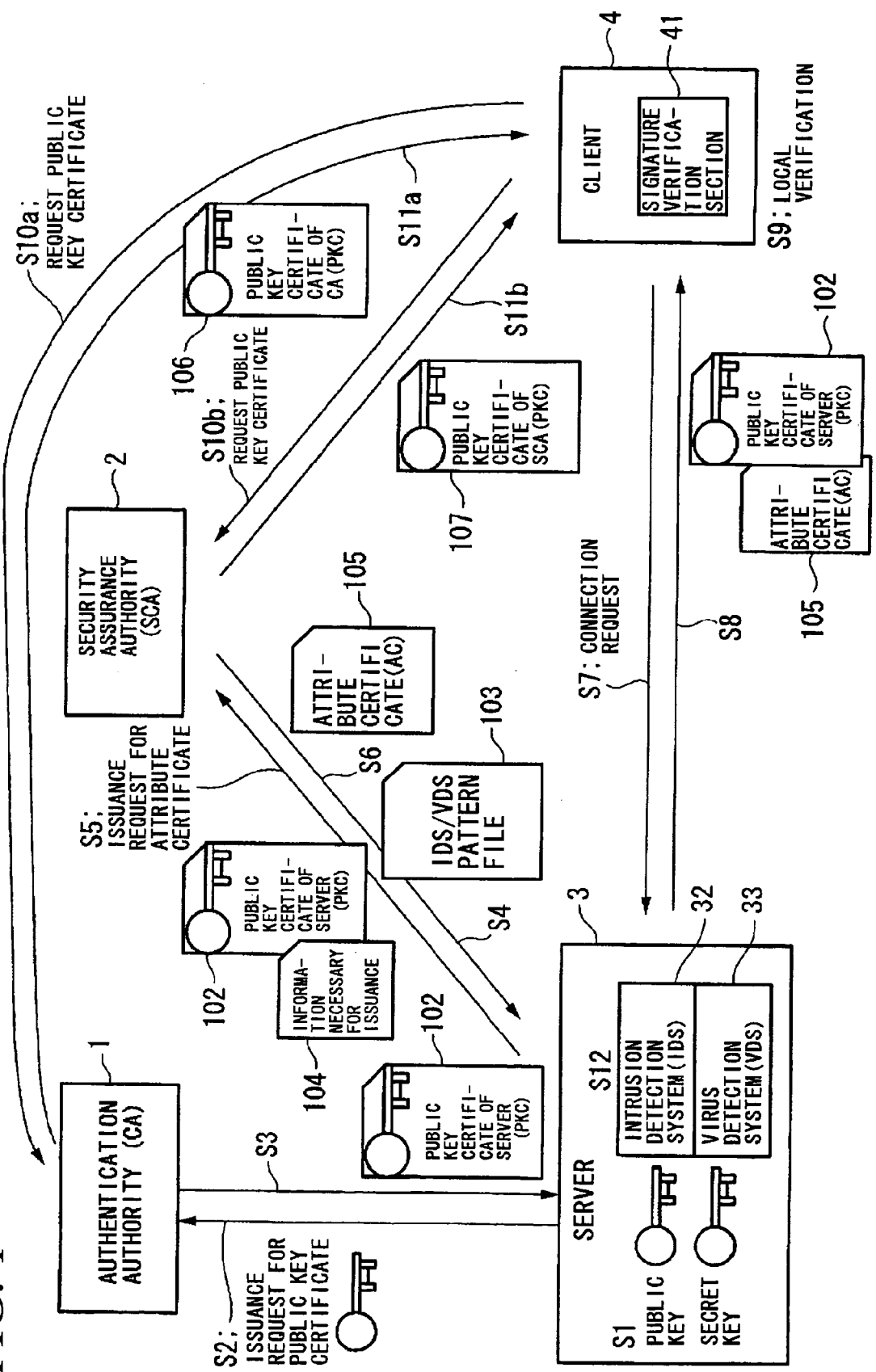
FIG. 1 is a block diagram showing the structure of a communication system according to an embodiment of the present invention.

In the following, embodiments for implementing the present invention are explained with reference to the drawings. FIG. 1 is a block diagram showing the structure of the communication system according to one embodiment of the present invention. This communication system is one which, along with performing authentication of the correct identity of a server during server/client communication, also assures the level of security (security level) of this communication. In the figure, a pre-existing certification authority (CA) 1 issues upon a request from a server 3 for issuance of a PKC (public key certificate), issues a PKC 102 (recognizability information) for a public key of the server 3. A security assurance authority. (SCA) 2 (a security assurance device) issues an AC 105 (attribute certificate) for assuring the security level of the server 3. The security assurance authority 2 is authenticated by the pre-existing certification authority 1, has obtained a PKC for its own public key issued, and is a third party institution which is trusted upon the social level.

The server 3 (the second communication device) is verified to see whether or not it has correct identity and verification, and it obtains an IDS (intrusion detection system) 32 and a VDS (virus detection system) 33, which are examples of security countermeasure systems. A client 4 (the first communication device) is a terminal device which is connected to the server 3 and which is to accept services. This client 4 obtains a signature verification section 41 which performs verification of the correct identity (the recognizability) of the server 3 and of its security level (its security during communication), based upon the PKC 102 and the AC 105 which are issued for the server 3. It is not shown in figures, however, the certification authority 1, the security assurance authority 2, the server 3, and the client 4 are mutually connected together via the internet.

Figure 2:
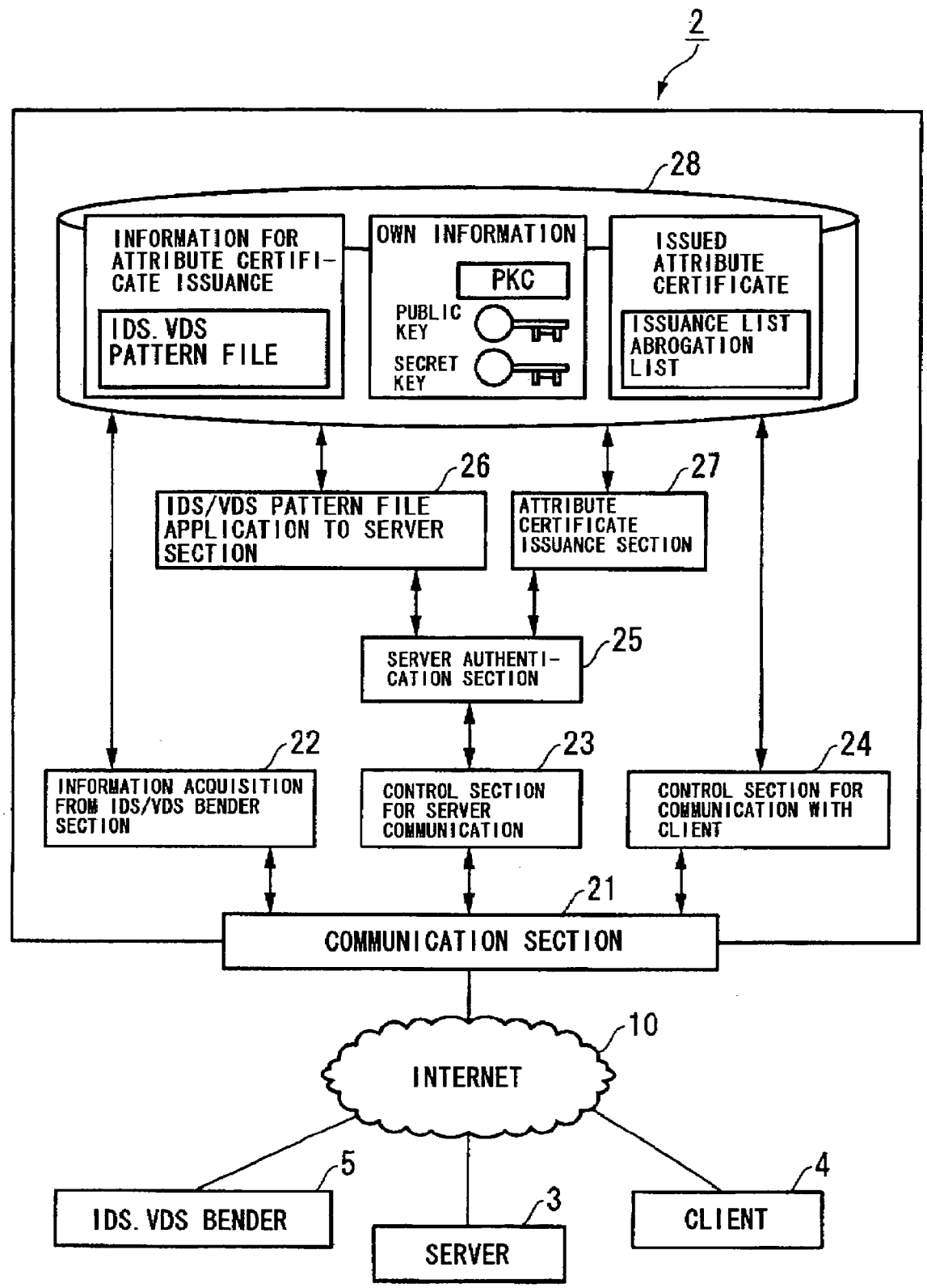
FIG. 2 is a block diagram showing the structure of a security assurance authority according to the embodiment of the present invention.

FIG. 2 is a block diagram showing the structure of the security assurance authority 2. The various elements of the structure in this figure are described. Via the internet 10, a communication section 21 performs sending and receiving information to and from other communication devices, such as the server 3, the client 4, an IDS/VDS bender 5, and the like. An information acquisition from the IDS/VDS bender section 22 acquires the most up to date IDS/VDS pattern files from the IDS/VDS bender 5 via the communication section 21, and stores them in a memory section 28. In these IDS/VDS pattern files, patterns of attacks and viruses which must be detected by the IDS and the VDS are stored in advance.

A control section 23 for communication with the server controls communication with the server 3. A control section 24 for communication with the client controls communication with the client 4. A server authentication section 25 performs authentication of the correct identity and the security level of the server 3. An IDS/VDS pattern file application to server section 26 generates dummy attacks upon the server 3, and details are described hereinafter. An attribute certificate issuance section 27 issues an attribute certificate (AC) if the correct identity and security level of the server 3 are confirmed by the server authentication section 25. A memory section 28 stores information which is necessary for issuance of an AC for the server 3, information which relate to its own public key and secret key, ACs which have been issued, and so on.

Figure 3:
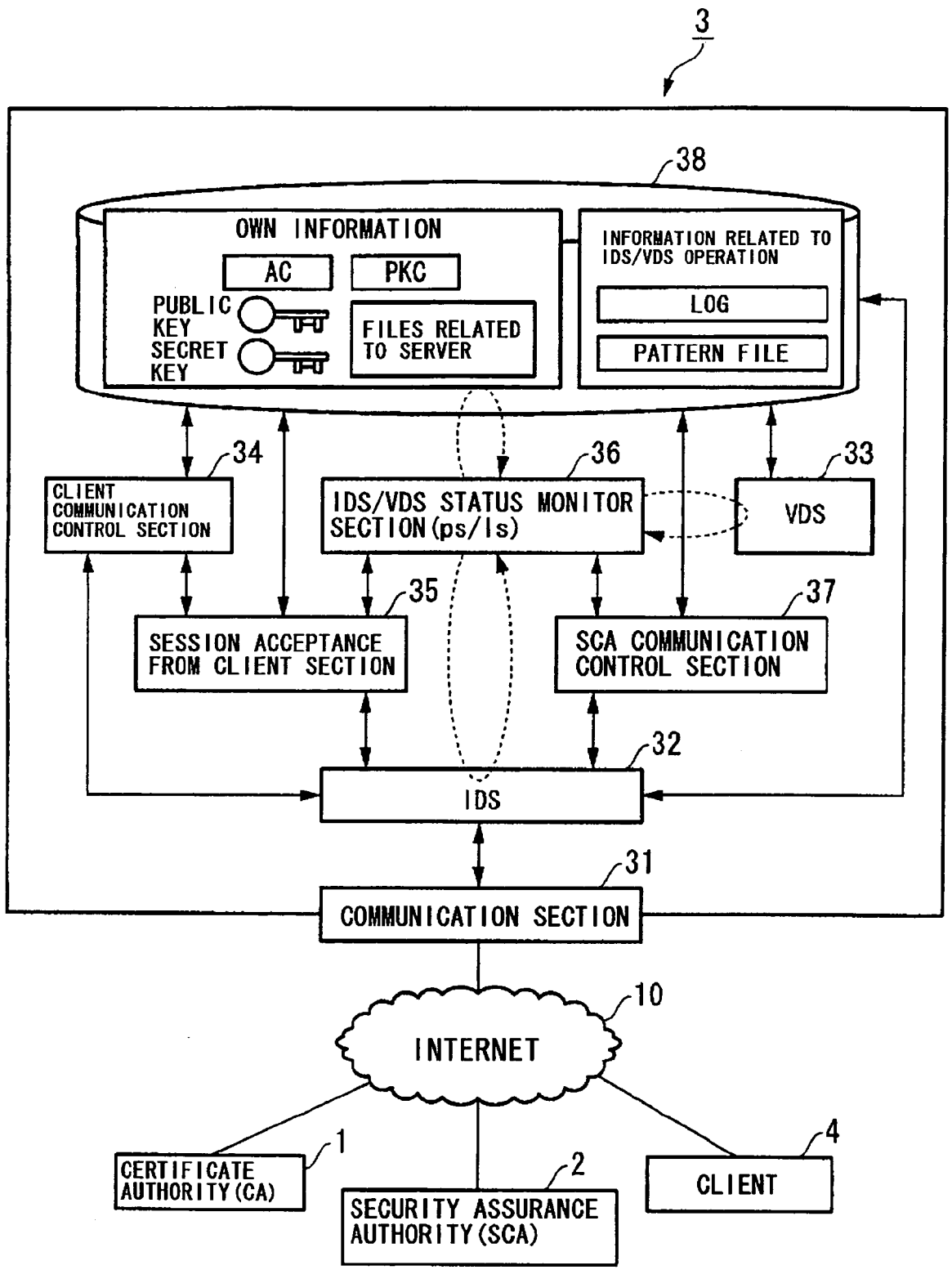
FIG. 3 is a block diagram showing the structure of a server according to the embodiment of the present invention.

FIG. 3 is a block diagram showing the structure of the server 3. In the following, the various structures shown in the figure are explained. Via the internet 10, a communication section 31 performs sending and receiving information to and from other communication devices, such as the certification authority 1, the security assurance authority 2, the client 4, and the like. A control section 34 for communication with the client controls communication with the client 4. A session acceptance from client section 35 sets up a session with the client 4 if a communication is requested from the client, and manages this session.

An IDS/VDS status monitor section 36 checks for activation of the IDS 32 and the VDS 33 using a "ps" command and an "ls" command, and acquires information related to their status of activation, and details are described hereinafter. A SCA communication control section 37 controls communication with the security assurance authority 2. And a memory section 38 stores information related to its own public key and secret key, PKCs which are issued by the certification authority 1, ACs which are issued by the security assurance authority 2, information related to operation of the IDS/VDS (such as logs, pattern files), and the like.

Next, the process of the communication system according to this embodiment of the present invention will be explained. The security assurance authority 2 creates a pair consisting of its own public key and secret key, and that a PKC is issued from the certification authority 1. Furthermore, the security assurance authority 2 acquires the most up to date IDS/VDS pattern files from the IDS/VDS bender 5. The server 3 generates a pair consisting of its own public key and secret key (in a step S1), generates PKC issuance request information for requesting a digital signature which assures the validity of the public key which it has generated, and transmits it to the certification authority 1 (in a step S2). The public key of the server 3 is included in this PKC issuance request information.

The certification authority 1 receives the PKC issuance request information, and, after having checked the identity of the server 3, generates a PKC 102 for the information of the server 3, including the public key of the server 3 which has been appended to the PKC issuance request information, including signature information upon which a digital signature has been encrypted with its own secret key, and transmits it to the server 3 (in a step S3). PKC 102 is received by the communication section 31 of the server 3, and is stored via the IDS 32 in the memory section 38. On the other hand, the control section for server communication 23 in the security assurance authority 2 reads the most up to date IDS/VDS pattern files from the memory section 28, and transmits them to the server 3 via the communication section 21 as an IDS/VDS pattern file 103 (in a step S4).

The communication section 31 in the server 3 receives IDS/VDS pattern file 103 from the security assurance authority 2, and outputs it to the IDS 32. The IDS 32 stores IDS/VDS pattern file 103 in the memory section 38. Furthermore, the SCA communication control section 37 generates AC issuance request information for requesting the issuance of an AC to which is to be linked to the PKC 102 which has been issued by the certification authority 1, and transmits it to the security assurance authority 2 via the IDS 32 and the communication section 31 (in a step S5). In this AC issuance request information, the PKC 102 of the server 3 (recognizability attestation information) and information necessary for AC issuance 104 (notification information) are included. The PKC 102 is information for the server 3 to prove its own identity to the security assurance authority 2, and the information necessary for AC issuance 104 is information for notifying its own security level to the security assurance authority 2, such as information related to its own IDS 32 and VDS 33 and the like. This information necessary for AC issuance 104 can also be stored in an extended field of the PKC 102.

The security assurance authority 2 receives this AC issuance request information from the server 3, and, along with authenticating the server 3 based upon the PKC 102, also performs authentication of the security level of the server 3 based upon the information necessary for AC issuance 104; and, if it is succeeded in both of these authentications, an AC 105 is generated based upon the PKC 102 and transmitted to the server 3 (in a step S6). In the following, the operation of the security assurance authority 2 in this step S6 is described in detail.

The control section for server communication 23 receives this AC issuance request information from the server 3 via the communication section 21, and outputs it to the server authentication section 25. The server authentication section 25 verifies the identity of the server 3, based upon the PKC 102 which has been appended to the AC issuance request information. In concrete terms, the server authentication section 25 decrypts, with the public key of the certification authority 1, the digital signature which is appended to the PKC 102 and which has been encrypted with the secret key of the certification authority 1, compares together the data of the public key and the like which has been obtained by decoding the digital signature, and the non encrypted data of the public key and the like which is appended to the PKC 102, and considers that it has succeeded in the authentication of the identity of the server 3, if both of them match with one another.

Furthermore, the server authentication section 25 verifies the security level of the server 3 based upon the information necessary for AC issuance 104 which has been appended to the AC issuance request information. The server authentication section 25 is able to distinguish whether or not the server 3 is implementing security countermeasures from the information which is included in the information necessary for AC issuance 104, and furthermore is able to obtain the security level of the server 3 more accurately due to various techniques which are described hereinafter. If it has succeeded in the authentication of the identity of the server 3 and in the authentication of its security level, then the server authentication section 25 instructs the attribute certificate issuance section 27 to issue an AC. Upon receipt of this instruction, the attribute certificate issuance section 27 generates an AC based upon the PKC 102, and stores it in the memory section 28. A digital signature with the secret key of the security assurance authority 2 is appended to this AC, and, furthermore, information which proves the security level of the server 3 (security certification information) is stored in an extended field. The attribute certificate issuance section 27 outputs the AC to the control section for server communication 23 via the server authentication section 25, and the control section for server communication 23 transmits this AC as the AC 105 to the server 3 via the communication section 21 (in the step S6).

Next, in order to start communication with the server 3, the client 4 transmits (in a step S7), connection request information to the server 3, which specifies a connection request for the server 3, and reception requests for the PKC 102 and the AC 105. The communication section 31 in the server 3 receives this connection request information, and outputs it via the IDS 32 to the session acceptance from client section 35. The session acceptance from client section 35, along with setting up a session with the client 4 based upon the connection request information, also instructs the client control section 34 to transmit the PKC 102 and the AC 105. Upon receipt of this instruction, the client control section 34 reads the PKC 102 and the AC 105 from the memory section 38, and outputs them via the IDS 32 to the communication section 31. And the communication section 31 transmits the PKC 102 and the AC 105 to the client 4 (in a step S8).

The client 4 receives the PKC 102 and the AC 105 from the server 3, and, if the client 4 itself possesses the public keys of the certification authority 1 and the security assurance authority 2, it verifies the digital signatures of the PKC 102 and the AC 105 (in a step S9). In other words, the signature verification section 41 of the client 4 decrypts the digital signature which is appended to the PKC 102 and which has been encrypted with the secret key of the certification authority 1 with the public key of the certification authority 1, compares together the data such as the public key and the like which has been obtained by decoding of the digital signature and the non encrypted data such as the public key and the like which is appended to the PKC 102, and, if these two mutually matches with one another, distinguishes that the authentication of the identity of the server 3 has succeeded.

Furthermore, the signature verification section 41 decrypts the digital signature which is appended to the AC 105 and which has been encrypted with the secret key of the security assurance authority 2 with the public key of the security assurance authority 2, compares together the data such as the public key and the like which has been obtained by decoding of the digital, signature and the non encrypted data such as the public key and the like which is appended to the AC 105, and, if these two mutually matches with one another, distinguishes that the authentication of the security level of the server 3 has succeeded.

On the other hand, if the client 4 is not in possession in advance of at least one of the public keys of the certification authority 1 and the security assurance authority 2, then it executes the following processes. If the client 4 is not in possession in advance of the public key of the certification authority 1, then the client 4 requests a PKC from the certification authority 1 (in a step S10*a*). The certification authority 1 receives a request for a PKC and transmits a PKC 106 for its own public key to the client 4 (in a step S11*a*). The client 4 receives the PKC 106, and its signature verification section 41 verifies the digital signature of the PKC 102 using this PKC 106.

Furthermore, if the client 4 is not in possession in advance of the public key of the security assurance authority 2, then the client 4 requests a PKC from the security assurance authority 2 (in a step S10*b*). The security assurance authority 2 receives a request for PKC and transmits a PKC 107 for its own public key to the client 4 (in a step S11*b*). The client 4 receives this PKC 107, and its signature verification section 41 verifies the digital signature of the AC 105 using this PKC 107.

After the above described verification, if the validity of the digital signatures of the PKC 102 and the AC 105 corresponding to the server 3 have been confirmed, then the server 3 and the client 4 start subsequent communication. Furthermore, the IDS 32 and the VDS 33 of the server 3 monitor the communication upon the side of the server 3 (in a step S12). If the validity of the digital signatures of the PKC 102 and the AC 105 are confirmed, then the client 4 displays summary information (refer to FIG. 4A) or detailed information (refer to FIG. 4B) related to the AC 105 upon a display section which is not shown in the figures. By displaying the information, the user is able visually to check upon the security level of the server 3. Furthermore, it is also possible to arrange for the user to be able to select whether or not to start communication based upon this display, as shown in FIG. 4A.

Next, the process of authentication of the security level of the server 3 by the security assurance authority 2 will be explained. One or more of the following items of security information for assuring security are appended in an extended field of the AC 105 which is issued by the security assurance authority 2 (however, this is in the case that the server 3 provides precise information):

- Information about the destination to which the certificate is issued (information which specifies the server 3)
- Information about the issuer of the certificate (information which specifies the security assurance authority 2)
- The date of issuance of the certificate (information which specifies when the certificate was issued)
- The term of validity of the certificate
- Various information related to the algorithm for creating the certificate
- The fact that communication is being monitored by the IDS or the VDS
- The names of tools, or the IDs of tools, related to the IDS or the VDS (information which specifies the IDS and/or the VDS)
- Version numbers related to the IDS and/or the VDS (information which specifies the IDS and/or the VDS)
- The most up to date pattern file of the IDS and/or the VDS which is applied (information which specifies the IDS and/or the VDS)
- The date of issuance of the most up to date pattern file of the IDS and/or the VDS which is applied (information which specifies the IDS and/or the VDS)
- The monitoring policy If multiple security tools are being applied by the server 3, a plurality of items of information related to each of the security tools is stored. Furthermore, the policy itself such as how to monitor communication with the IDS and/or the VDS, or the policy ID, is stored. Here, policy means how to apply the pattern files such as IP scan attacks are detected, or port scan attacks are not detected.

It may also happen, according to circumstances, that the accurate information like the above leads to the leakage of security information. For example it may also happen that, when utilizing an IDS or a VDS which has vulnerability, or due to delay in applying the pattern file or the like, information for evasion from the monitoring system becomes known to an intruder. Accordingly, it can also be acceptable to store only the items of information described below in the extended field of the AC 105, and only to notify the client 4 of the level of assurance by the security assurance authority 2.

- Information about the destination to which the certificate is issued
- Information about the issuer of the certificate
- The date of issuance of the certificate
- The term of validity of the certificate
- Various information related to the algorithm for creating the certificate
- The fact that communication is being monitored by the IDS or the VDS The above described information is determined individually by the security assurance authority 2, or is created by the security assurance authority 2 based upon the information necessary for AC assurance 104 which is transmitted from the server 3 to the security assurance authority 2. For example, the information about the destination to which the certificate is issued is created by the security assurance authority 2, based upon the PKC 102 which it has acquired from the server 3. Furthermore, the information about the issuer of the certificate, the date of issuance of the certificate, the term of validity of the certificate, and the various items of information related to the algorithm for creating the certificate are determined by the security assurance authority 2. Moreover, the information such as the fact that communication is being monitored by the IDS or the VDS, and the names of tools, or the ID of tools, related to the IDS or the VDS, are created by the security assurance authority 2, based upon the information necessary for AC issuance 104 which has been acquired from the server 3.

If it is the case that the security assurance authority 2 has succeeded in authentication of the correct identity of the server 3, and if the information which specifies the fact that communication is being monitored by the IDS or the VDS is stored in the information necessary for AC issuance 104 as the minimum limit of necessary information for issuance of an AC, then, based upon the information, the security assurance authority 2 may trust that the server 3 is implementing security countermeasures, and may generate an AC 105 and transmit it to the server 3; however, since there is a possibility that the server 3 is a malicious server, a technique is required for assuring the security level of the server 3 more precisely. A technique for assuring the security level of the server 3 more precisely is described below in detail.

(1) Management of the Server System by an Internet Service Provider (ISP)

In an environment in which the server 3, or an external device which is subsequently described and which is executing the process of the server 3 on its behalf, is being managed within the facilities of an ISP or the security assurance authority 2 or the like, the operational state of the IDS or of the VDS in the server 3 is directly checked by the operator of the ISP or the security assurance authority 2.

(2) Utilization of the Anti-Tamper Functions of the Server System Itself

If an ISP or the security assurance authority 2 is providing an external device such as described hereinafter which executes the process of the server 3 on its behalf, then the anti-tamper functions of this device (its function of preventing improper access and improper alteration) is ensured. For example, in the case of an external device such as described hereinafter which executes the process of the server 3 on its behalf, a mechanism is provided in which, by just unsealing this device, the memory and disk upon which the software that regulates the process of this device is stored, or the circuitry itself or the like which implements to action of this device, are physically destroyed so that they become unusable. Due to this, it is possible to protect the internal structure of such an external device, and to prevent it being counterfeited.

Furthermore, a structure is provided such as, by using bi-directional authentication with SSH communication, rejecting remote operation of the IDS or the VDS except for the ISP or the security assurance authority 2, in the external device which executes the processing of the server 3 on its behalf or the server 3 itself. In the following, this case is described in detail. In bi-directional authentication with SSH, there are two types of public key encoding authentication method and password authentication method. In the following, the "signal source" "signal receipt" model, which is the one that is generally used, is explained.

In the public key encryption authentication method, electronic signature data which has been signed with the secret key which the sender itself possesses is transmitted to the receiver. The receiver decrypts this electronic signature data with the public key of the sender, and verifies the validity of its electronic signature. In this verification, a PKC which has been issued by a pre-existing certification authority is used. By exchanging PKCs mutually in both directions between the security assurance authority 2 and the server 3, it is possible to perform mutual authentication. On the other hand, in the password authentication method, the authentication is performed by sending and receiving passwords which have been negotiated and determined in advance by both the sender and the receiver. This is a method which is taken advantage of widely and generally, but, in the case of SSH communication, these passwords are sent and received while being protected by encryption. In this case, the passwords are determined in advance between the security assurance authority 2 and the server 3. In this case, the communication session can be started by either one of the security assurance authority 2 and the server 3.

After the above described authentication, the security assurance authority 2 and the server 3 perform encrypted communication (for example, by a secret key encoding method). In this encrypted communication, the security assurance authority 2 controls the various sections of the server 3 and remotely operates the server 3 by transmitting operation information for operation and control of the server 3. The server 3 generates information related to the IDS 32 and the VDS 33 based upon the operation information, and transmits it to the security assurance authority 2. The security assurance authority 2 receives the information, and uses it instead of the information necessary for AC issuance 104, thus performing verification of the security level of the server 3.

Furthermore, the above described process may also be performed, not by remote operation of the server 3 by the security assurance authority 2, but by the server 3 which is processing independently. In other words, after the server 3 has performed bi-direction authentication with the security assurance authority 2, it generates the information related to the IDS 32 and the VDS 33, and transmits it to the security assurance authority 2. The security assurance authority 2 receives the information, and uses it instead of the information necessary for AC issuance 104, thus performing verification of the security level of the server 3.

(3) Checking Status of the Monitoring Process Upon the Server Side

A dedicated function is prepared in advance upon the server 3 for checking the status of the IDS 32 and the VDS 33. In the case of the Linux OS, this is a function of obtaining information about the process in action with the "ps" command. By executing a "ps" command upon the server 3, it is possible to acquire, from among the information which has been obtained, the name of the IDS process (or of the VDS process), and the size of the IDS process (or of the VDS process); and, if these are items of correct information (if they are the same as the information which has been notified by the server 3 to the security assurance authority 2), then it is decided that the system is working. Concretely, the command is shown as follows:

>ps-ef|grep process name

Furthermore, in order to check whether or not the pattern file which is applied is the most up to date one, by executing a "ls" command upon the server 3, it is possible to acquire, from among the information which has been obtained, the name of the pattern file, the size of the pattern file, and the date of the pattern file (the day it was updated), and the information can be obtained that the most up to date pattern file has been applied. Concretely, the command is shown as follows:

>ls-1 directory name/file name

The server 3 collects the state information which indicates the state of the IDS 32 or the VDS 33 which has been acquired by executing the two commands described above, and transmits them to the security assurance authority 2 together. However there is a danger that, at this time, a malicious server may fake this information. In order to prevent this, the above two items of information collection processing and the procedure of transmitting them to the security assurance authority 2 are made into a single program, and the software for this program is obfuscated, therefore, falsification of the executable module is prevented.

As methods for obfuscation, there are techniques with which, by deforming the structure of the program which is originally written in a well organized manner, its analysis is made to be difficult, while the result of its execution is not changed. In concrete terms, such techniques include:

Adding unnecessary code which exerts no influence upon execution
Replacing instruction code with other equivalent code
Separating a single calculation into multiple calculations
Separating a module (a function, a subroutine) which has a single function into a multiple modules Making the software larger than the original size by providing multiple modules which perform the same processing Various modifications as shown above can be applied to the program. As the timing for making the program obfuscated in this manner, there are two types: in one type, first the source code is obfuscated, and then it is compiled to obtain executable code; while, in the other type, first the source code is compiled, and then it is obfuscated, thus obtaining executable code.

When processing the above described status check, the IDS/VDS status monitor section 36 of the server 3 executes a process which corresponds to a ps command or to an ls command, and the status information for the above described process which is activated or pattern file for the IDS 32 or the VDS 33 (or both) is created, and is output via the IDS 32 to the communication section 31. And the communication section 31 transmits the status information to the security assurance authority 2.

The communication section 21 of the security assurance authority 2 receives the status information, and outputs it to the server authentication section 25 via the control section for server communication 23. The server authentication section 25 authenticates the security level of the server 3 in the following manner. The server authentication section 25 compares together the information necessary for AC issuance 104 which it has received from the server 3 and the status information, and verifies that the name of the IDS process, the size of the IDS process, the name of the pattern file, the size of the pattern file, and the date of the pattern file given in the status information matches with these contents included in the information necessary for AC issuance 104.

If the contents of the status information and the contents of the information included in the information necessary for AC issuance 104 matches with one another, then the server authentication section 25 distinguishes that the security level of the server 3 is confirmed, and terminates the authentication procedure. By doing this process, the security assurance authority 2 is able to recognize that the information which has been notified from the server 3 as the information necessary for AC issuance 104 is correct information which matches with the contents of the status information obtained based upon the executable module which cannot be falsified, and is able to check and assure the security level of the server 3 more precisely. In the above described case, it is necessary for status information about the IDS 32 or the VDS 33 to be included in the information necessary for AC issuance 104 which is transmitted by the server 3 to the security assurance authority 2.

(3) A Check from Outside for Application of the Pattern File

The security assurance authority 2 give dummy attacks upon the server 3, and acquires a log which has been output from the IDS 32 or the VDS 33 of the server 3, and, based upon the log, checks whether or not the server 3 is applying the most up to date pattern file. In this case, the IDS/VDS pattern file application to server section 26 reads the most up to date pattern file (pattern information) from the memory section 28, and recognizes the updated attack pattern (signature). In this recognition of the updated attack pattern, it can be also acceptable that the IDS/VDS pattern file application to server section 26 reads the most up to date pattern file and the immediately previous version of the pattern file from the memory section 28, compares their contents together, and recognizes the pattern which is only included in the most up to date pattern file as the attack pattern which has been updated.

Next, the IDS/VDS pattern file application to server section 26 continually creates attack packets based upon the attack pattern which has been updated, and outputs them to the control section for server communication 23 via the server authentication section 25. And the control section for server communication 23 continually transmits these attack packets to the server 3. The communication section 31 of the server 3 receives these attack packets, and outputs them to the IDS 32. The IDS 32 reads the most up to date pattern file from the memory section 38, and monitors the packets based upon the pattern file, and, when it has detected a packet which matches with the most up to date attack pattern, it records the name of this attack pattern (its signature name), the IP address of the sender, and time instant information and the like in its log (attack detection information).

The IDS 32 reads its log at a predetermined timing, and outputs it to the communication section 31. The communication section 31 transmits the log to the security assurance authority 2. The communication section 21 of the security assurance authority 2 receives the log, and outputs it to the server authentication section 25 via the control section for server communication 23. The server authentication section 25 verifies whether or not the updated attack pattern is recorded in the log, and, if it has been recorded, takes it that the confirmation of the security level of the server 3 is completed, and finishes the authentication process. By doing this, the security assurance authority 2 is able to check whether or not the server 3 obtains security countermeasures based upon the most up to date pattern file, and is able to check and to assure the security level of the server 3 more reliably.

It should be understood that it would also be acceptable for the security assurance authority 2 to create attack packets which have been infected with viruses, based upon the most up to date pattern files related to viruses, and to transmit them to the server 3. In this case, the VDS 33 detects the packets with viruses, based upon the most up to date pattern file, and records them in its log. And the security assurance authority 2 acquires this log in the same manner as described above, and authenticates the security level of the server 3 based upon the most up to date pattern file and the log.

Next, another form of the issuance procedure for the PKC and the AC will be explained. It is possible for the pre-existing certification authority 1 to serve the function of the security assurance authority 2, and, in this case, both the PKCs and the ACs are issued by the certification authority 1. Conversely, it is also acceptable for the security assurance authority 2 to serve the function of the pre-existing certification authority 1, and, in this case, both the PKCs and the ACs are issued by the security assurance authority 2. Furthermore, it could also be acceptable for the pre-existing certification authority to issue the PKCs, and for the IDS/VDS bender to issue the ACs.

Next, the IDS and the VDS, and the way in which they manage and update the pattern files, will be explained. It can be acceptable that the server manager itself executes the entire process from the selection of the IDS and the VDS to applying and managing of the pattern files such as the application of the pattern files and so on; or the server manager processes the selection of the IDS and/or the VDS, while, with regard to the application of their pattern files, it can be delegated to the security assurance authority 2, or to the bender which provides the IDS and/or the VDS. Moreover, it can also be acceptable that the security assurance authority 2 or the bender which provides the IDS and/or the VDS executes the entire process from the selection of the IDS and the VDS to applying of the pattern files. In this case, the security assurance authority 2 or the bender has only the task to assign network devices in which the IDS or the VDS are set-up (a hardware gateway or the like) to the server manager, and the server manager only undertakes the task of installing them.

Next, the delegation of various processes which the server 3 processes will be explained. Generally, when setting up a server, it is desirable for the server itself to be of a simple structure, so as not to impose an excessive processing load. Thus:

(1) The creation process for a public key and a secret key;

(2) Management of issuance requests for PKCs and of the certificates which have been issued;

(3) Updating of the pattern files of the IDS/VDS;

(4) Management of issuance requests for ACs to the security assurance authority 2, and of the certificates which have been issued;

(5) Monitoring of communication by the IDS or the VDS; and (6) Various types of processing for presenting the PKC and the AC to the client 4; may be delegated to an external device.

Although, in FIG. 1, the server 3 is arranged to execute all of the above described processes (1) through (6), in order to alleviate the processing load upon the server 3, it would be acceptable to delegate any one, any combination, or all of these procedures (1) through (6) to a proxy device, a network gateway (N-GW) such as a router or a firewall or the like, or a device such as a home gateway (H-GW) or the like.

Next a method will be explained in which, when the server 4 transmits a PKC 102 and an AC 105 to the client 4, any malicious servers which attempt to perform this action are eliminated. When the server 3 receives a connection request from the client 4, it transmits a PKC 102 and an AC 105 to the client 4. At this time, a malicious server may transmit the AC 105, even though the IDS and the VDS are not activated on it. Here, the server 3 which has received the connection request from the client 4 fires a ps command or an ls command, and transmits the AC 105 to the client 4 only if the IDS and the VDS are activated and it has been possible to check that the most up to date pattern file is being applied. It is possible to prevent malicious falsification by collecting together the status check process for the IDS and the VDS by the ps command or the ls command and the providing process of the AC 105 to the client 4 into a single program as a unified item of software, and by obfuscating this unified item of software.

Next, the procedure for revocation of a certificate will be explained. If vulnerability information related to the IDS or the VDS has been made public, or if a new pattern file has come out, it becomes necessary to cancel ACs which have been issued in the previous situation. For this cancellation, a CRL (Certificate Revocation List) as shown in FIG. 8 is employed. In this case, the certification authority 1 or the security assurance authority 2 manages the CRLs related to the PKCs and the ACs which have been issued, and responds when a validity enquiry arrives from the client 4.

It should be understood that, when the signature verification section 41 of the client 4 performs authentication of the correct identity and the security level of the server 3 based upon a PKC 102 and an AC 105 which have been transmitted from the server 3, it would also be acceptable to arrange to determine automatically whether or not to accept communication with the server 3, according to the contents of the PKC 102 and the AC 105.

Although, in this embodiment described above, the IDS 32 and the VDS 33 are provided to the server 3 as security countermeasure systems, it would also be acceptable to provide a firewall or a quarantine system as a security countermeasure system. A firewall is a device for rejecting accesses which are not permitted at a connection point of the network or terminal, and principally is a device for defense against attack by limiting access from an external network to an internal network. Furthermore, a quarantine system is one which checks upon the state of the versions and patches of the OS and applications, and which maintains to make them in the most up to date state.

It is also acceptable that, when the server 3 transmits the information necessary for AC issuance 104 to the security assurance authority 2, the server 3 checks the version, status of the patch, and the port settings and so on of the OS and the applications which the server 3 itself possesses, stores information of these items within the information necessary for AC issuance 104 together, and transmits the information to the security assurance authority 2. The security assurance authority 2 may verify the security level of the server 3 based upon the above described items of information for the OS or the applications of the server 3.

Although, in this embodiment of the present invention, by using a pre-existing PKI, the security assurance authority processes verification of the correct identity of the server 3 along with its security level, a PKI is not absolutely necessary for performing the verification of the security level of the server 3. Accordingly, it would also be acceptable to send or receive a PKC between the security assurance authority 2 and the server 3 in the case that the certification authority 1 is not provided. Furthermore, in this embodiment of the present invention, the security assurance authority 2 stores information which proves the security level of the server 3 in an extended region of the AC 105 and transmits it to the server 3, however, this is not to be considered as limitation of the present invention, and it is also acceptable to transmit the information which proves the security level of the server 3 as included in an independent security certificate. Yet further, instead of the AC, it is also be acceptable to store the above described information in an extended region of the PKI; or, it is also acceptable to store the above described information in a certificate of the format defined by SPKI (refer to, for example, the document "ITU-T, "SPKI Certificate Theory", IETF, RFC2693, 1999").

Figure 5:
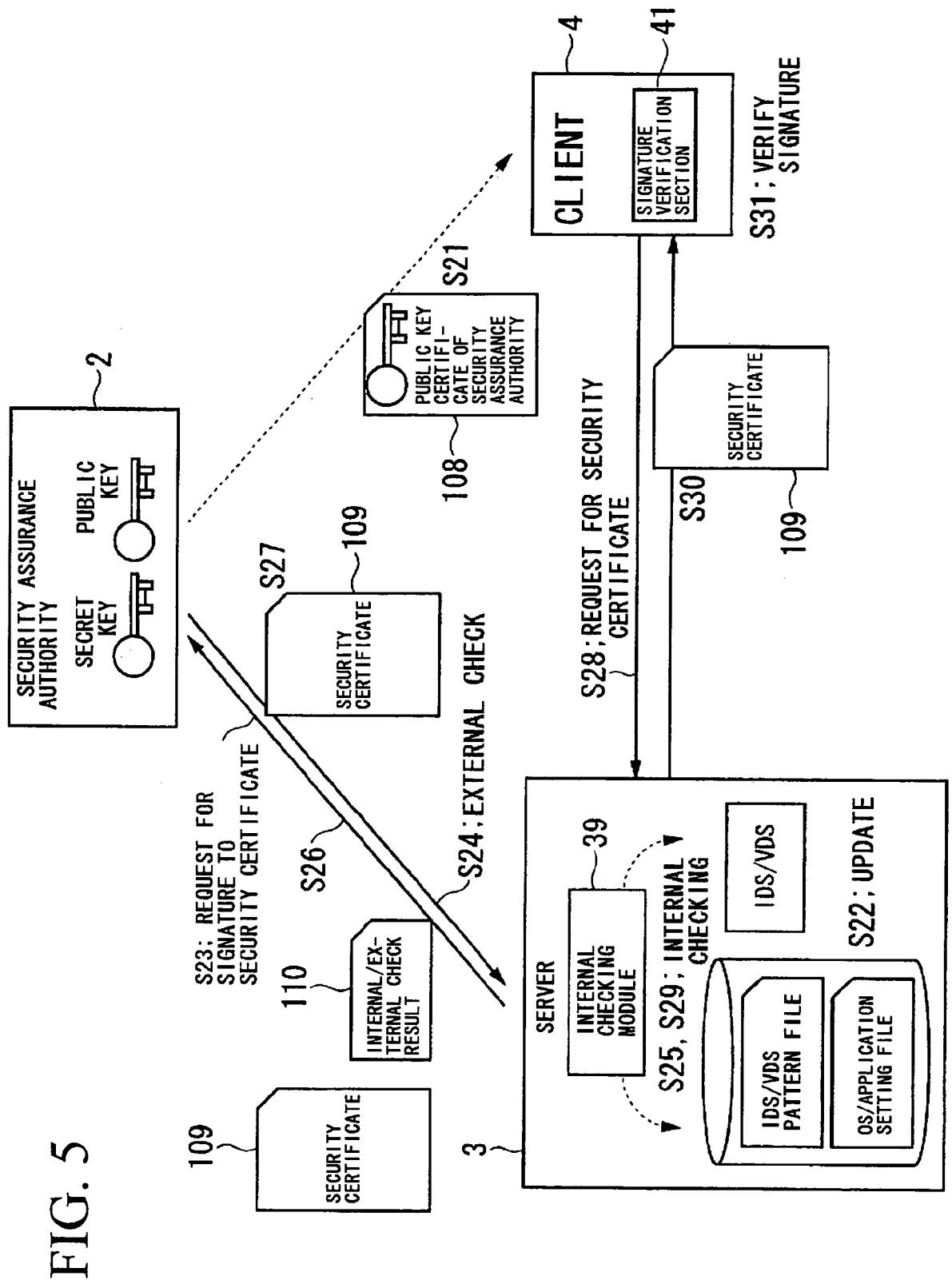
FIG. 5 is a block diagram showing the structure of a communication system according to a variant example of the embodiment of the present invention.

Next, a variant example of this embodiment of the present invention will be explained. FIG. 5 is a block diagram showing the structure of a communication system according to this variant example. In FIG. 5, the certification authority 1 and the authentication of the correct identity based upon the PKI are omitted. In this variant example as well, authentication of the correct identity may be performed, or may not be performed. An internal checking module 39 which is provided within the server 3 and which is software or hardware, when it has received an external check from the security assurance authority 2 (a dummy attack based upon the most up to date attack pattern), checks the status of the IDS 32 and the VDS 33, or the version of the OS/application, or the like. In this variant example, it is supposed that the information which proves the security level of the server 3 is included within a security certificate 109.

Furthermore, in this variant example, the issuance of the security certificate 109 is processed by the server 3, and the security assurance authority 2 performs the signature upon the security certificate 109 which has been issued by the server 3. The security certificate 109 of the server 3 which has been issued by the server 3 itself, is in a temporally state, and it becomes an effective certificate for the client 4 at the time point when a signature is performed by the security assurance authority 2.

The security assurance authority 2 creates a pair consisting of its own public key and secret key, and receives the issuance of a PKC from the pre-existing certification authority 1. Furthermore, the client 4 receives the PKC 108 of the security assurance authority 2 in advance, and stores it (in a step S21). The server 3 executes updating of the IDS 32/VDS 33 and the version and pattern file of the OS/applications (in a step S22). Next, along with updating the above described security countermeasures, the server 3 transmits the information which specifies a request for a signature to the security certificate, to the security assurance authority 2 (in a step S23).

Upon receipt of this information, in order to check the activation status of the IDS 32 and the VDS 33 and the state of the pattern files and the like of the IDS 32 and the VDS 33 in the server 3, the security assurance authority 2 continually creates attack packets in the same manner as in the processes described above, and transmits them to the server 3 (in a step S24: external checking). In the server 3, the communication section 31 receives these attack packets, and outputs them to the IDS 32. The IDS 32 reads the most up to date pattern files from the memory section 38 and monitors the packets based upon these pattern files, and, if it detects a packet which matches with the most up to date attack pattern, records in its log in the memory section 38 the name of this attack pattern (the name of the signature), the IP address of the sender, time instant information, and the like.

After an attack packet from the security assurance authority 2 has arrived at the server 3, the internal checking module 39 performs internal checking at a predetermined timing. In other words, the internal checking module 39 checks the activation status of the IDS 32 and the VDS 33 and the state of the pattern file, and acquires the same information as the information necessary for AC issuance 104, as will be described hereinafter. Furthermore, with regard to the state of the OS and the applications, the internal checking module 39 check suspicious applications and the port settings and the like, and generates information which specifies the result of this internal checking (in a step S25).

The server 3 creates a temporal security certificate 109 based upon the information which has been acquired by the internal checking module 39, and transmits it to the security assurance authority 2. Furthermore, the server 3 transmits the information which specifies the result of its internal checking and its log information to the security assurance authority 2 as an internal/external check result 110 (in a step S26). The communication section 21 of the security assurance authority 2 receives the above described security certificate 109 and internal/external check result 110, and outputs them to the server authentication section 25 via the control section for server communication 23.

The server authentication section 25 verifies whether or not the most up to date security countermeasures are being undertaken by the server 3 and are being appropriately applied.

In other words, the server authentication section 25 verifies whether or not an attack pattern which is based upon the most up to date pattern file that has been used when generating packets for dummy attacks is recorded in the log, moreover, verifies whether or not the format of the security certificate 109 is written in the predetermined format, verifies whether or not the required information is stored, and the like. If the result of this verification indicates that an attack pattern which has been updated based upon the most up to date attack pattern is recorded in the log, and that the format of the security certificate 109 and the like satisfies the predetermined conditions, then the server authentication section 25 takes that checking of the security level of the server 3 has been completed, and generates signature information using the secret key of the security assurance authority 2 and appends it to the security certificate 109. The server authentication section 25 transmits this security certificate 109 to the server 3 via the control section for server communication 23 and the communication section 21. Then the server 3 receives this security certificate 109 which has been transmitted by the security assurance authority 2 (in a step S27).

It should be understood that it would also be acceptable for the security assurance authority 2 not to processes any external check, but just to instruct the server 3 to process internal checking based upon the signature request from the server 3, to process formal verification of the security certificate 109 which has been generated by the server 3 based upon its internal checking, and to append a signature upon the security certificate 109. By the security assurance authority 2 processing external checking, and taking the result of its external checking as matter for verification of the security level of the server 3, it is possible to check and assure the security level of the server 3 more reliably.

At the time point of starting communication, the client 4 requests the server 3 to produce the security certificate 109 (in a step S28). The internal checking module 39 in the server 3 performs internal checking (in a step S29), and checks whether or not the status of the IDS 32, the VDS 33, the pattern file and so on is the same status as the information which is stored in the security certificate 109; and, if they are in the same status, transmits the security certificate 109 to the client 4 with the signature of the security assurance authority 2 appended (in a step S30). The client 4 receives this security certificate 109, and the signature verification section 41 of the client 4 processes verification of the signature which is appended to the security certificate 109, using the public key of the security assurance authority 2 (in a step S31). If the result of this verification is that the signature is valid, then the client 4 starts communication with the server 3.

Figure 6:
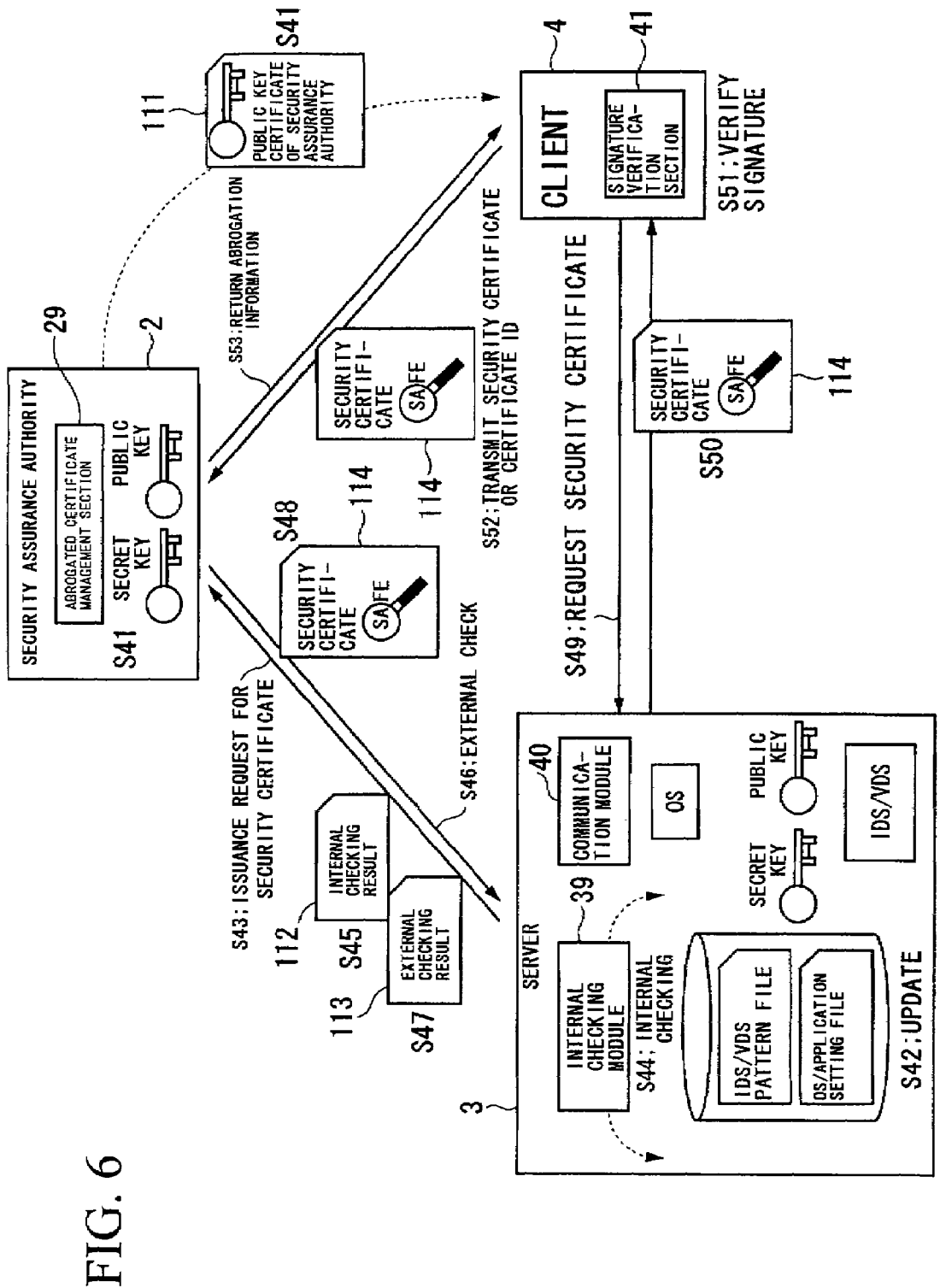
FIG. 6 is a block diagram showing the structure of a communication system according to another variant example of the embodiment of the present invention.

Next, another variant example of the embodiment of the present invention will be explained. FIG. 6 is a block diagram showing the structure of a communication system according to this variant example. In this variant example as well, the certification authority 1 shown is omitted in the figure. The security assurance authority 2 of this variant example obtains an abrogated certificate management section 29 which performs management of the validity of security certificates. Furthermore, in the server 3, a communication module 40 consists of hardware or software which controls communication between the server 3 which includes the previously described communication section 31, client communication control section 34, SCA communication control section 37, and so on, and external devices.

Furthermore, in this variant example, the following three points, which are effective in planning the implementation of this communication system, are now described in detail.

(A) A new communication protocol which is for communication process on TCP/UDP between the security assurance authority 2 and the server 3, between the server 3 and the client 4, and between the security assurance authority 2 and the client 4.

(B) An issuance process and an abrogation process for security certificates. In particular, with regard to the abrogation process, instead of the prior art processing method using a CRL, a processing method to abrogate multiple security certificates which assure the same contents all together is disclosed.

(C) A technique for bringing the internal checking module 39 of the server 3 to be anti-tamper.

First, the overall action of this communication system shown in FIG. 6 is explained. The security assurance authority 2 creates a pair consisting of its own public key and secret key, and receives the issuance of a PKC from a pre-existing certification authority. Furthermore, the client 4 receives a PKC 111 in advance from the security assurance authority 2, and keeps it (in a step S41). The server 3 performs updating of the IDS 32/VDS 33, the versions of the OS and applications and pattern files (in a step S42). Next the server 3, along with updating the above described security countermeasures, transmits information specifying status of updating of the above described security countermeasures and a security certificate signature request to the security assurance authority 2 (in a step S43).

Next, the internal checking module 39 checks suspicious applications and port settings and so on which relate to the status of the OS and applications, and creates information which specifies the result of this internal checking (in a step S44). The communication module 40 transmits information which specifies the result of this internal checking to the security assurance authority 2 as an internal checking result 112. The security assurance authority 2 receives this internal checking result 112 (in a step S45). In order to check the activation status of the IDS 32 and the VDS 33 in the server 3 and the state of pattern files and so on, the security assurance authority 2 continually generates attack packets by the same operation as described above, and transmits them to the server 3 (in a step 46: external checking).

In the server 3, the IDS 32 records information related to packets which match with the most up to date attack pattern in the log of the memory section 38, in the same manner as with the operation described above. The communication module 40 transmits the information in the log to the security assurance authority 2 as an external check result 113. The security assurance authority 2 receives this external check result 113 (in a step S47). It is acceptable to perform either the internal checking or the external checking first, but, in this variant example, the internal checking is performed first.

The security assurance authority 2 verifies whether or not the most up to date security countermeasures are being implemented upon the server 3 and are being appropriately applied, based upon the internal checking result 112 and the external checking result 113, in the same manner as with the action described above. In other words, the server authentication section 25, along with verifying whether or not attack patterns based upon the most up to date pattern file which was used when generating the packets for the dummy attacks are recorded in the log, also verifies whether the necessary information is included in the internal checking result 112, and whether or not the security countermeasures of the server 3 indicated by the internal checking result 112 are the most up to date ones, and the like.

If the result of this verification is that an attack pattern which has been updated based upon the most up to date attack pattern is recorded in the log, and that the internal checking result 112 satisfies the predetermined conditions, then it is taken that the confirmation of the security level of the server 3 is completed, and the server authentication section 25 creates signature information using the secret key of the security assurance authority 2, and creates a security certificate 114 to which this signature information is appended. The server authentication section 25 transmits this security certificate 114 to the server 3 via the control section for server communication 23 and the communication section 21. And the server 3 receives this security certificate 114 (in a step S48).

At the starting time point of communication, the client 4 requests the server 3 to evidence the security certificate 114 (in a step S49). The communication module 40 of the server 3 transmits the security certificate 114 to which the signature of the security assurance authority 2 has been appended, to the client 4 (in a step S50). In this variant example, in order to increase the speed, the internal checking of the server 3 is omitted. The server 3 may also perform internal checking periodically for the request to evidence a security certificate from the client 4. The client 4 receives the security certificate 114, and the signature verification section 41 performs verification of the signature which is appended to this security certificate 114, using the public key of the security assurance authority 2 (in a step S51).

If the result of this verification is that the signature is valid, the client 4 either transmits the entire security certificate 114 to the server 3, or transmits a certificate ID (a serial number which is described hereinafter) which is appended to the security certificate 114 (in a step S52). The communication section 21 of the security assurance authority 2 receives the security certificate 114 or its certificate ID, and outputs it to the abrogated certificate management section 29 via the control section for communication with client 24. The details are described hereinafter, however, this abrogated certificate management section 29 verifies whether the security certificate 114 is valid or whether it has been abrogated, and outputs information which indicates the result of this verification to the control section for communication with client 24. The control section for communication with client 24 transmits information giving this verification result to the client 4 via the communication section 21 (in a step S53).

The client 4 receives this information giving the result of verification, and decides upon the validity of the security certificate 114 based upon this information. If it is confirmed that the security certificate 114 has not been abrogated, and is a valid security certificate, then the client 4 starts communication with the server 3.

Next, the communication protocol which is used during communication between the security assurance authority 2 and the server 3, between the server 3 and the client 4, and between the security assurance authority 2 and the client 4 will be explained. In prior art PKI, a server which wishes to receive a signature to a public key certificate sends identity information or public key information to a public certification authority by using a physical path such as transmission by post or the like. Depending upon circumstances, these items of information may also be sent via the network, however, basically, on the side of the certification authority, some kind of physical proof is referred to, and this is taken as guaranty for the validity of the information which has been sent and received.

However, in the case of a security certificate, it is necessary to plan for invalidation or updating of the certificate every time a previously unknown attack or virus is detected, and, also in order to maintain immediacy, it is necessary to apply procedure over the entire network in a more on-line manner. Thus the investigation of communication methods for reliable authentication of the target party upon a network, and for preventing eavesdropping upon information, is very important.

First, the communication protocol between the security assurance authority 2 and the server 3 will be explained. Communication between the security assurance authority 2 and the server 3 starts from a phase of guaranteeing the entire communication path with a pre-existing mutual authentication and encryption protocol. Next, a starting request phase, a security evaluation phase, and the like are processed, and finally the procedure terminates with processing the issuance of a security certificate.

Figure 7B:
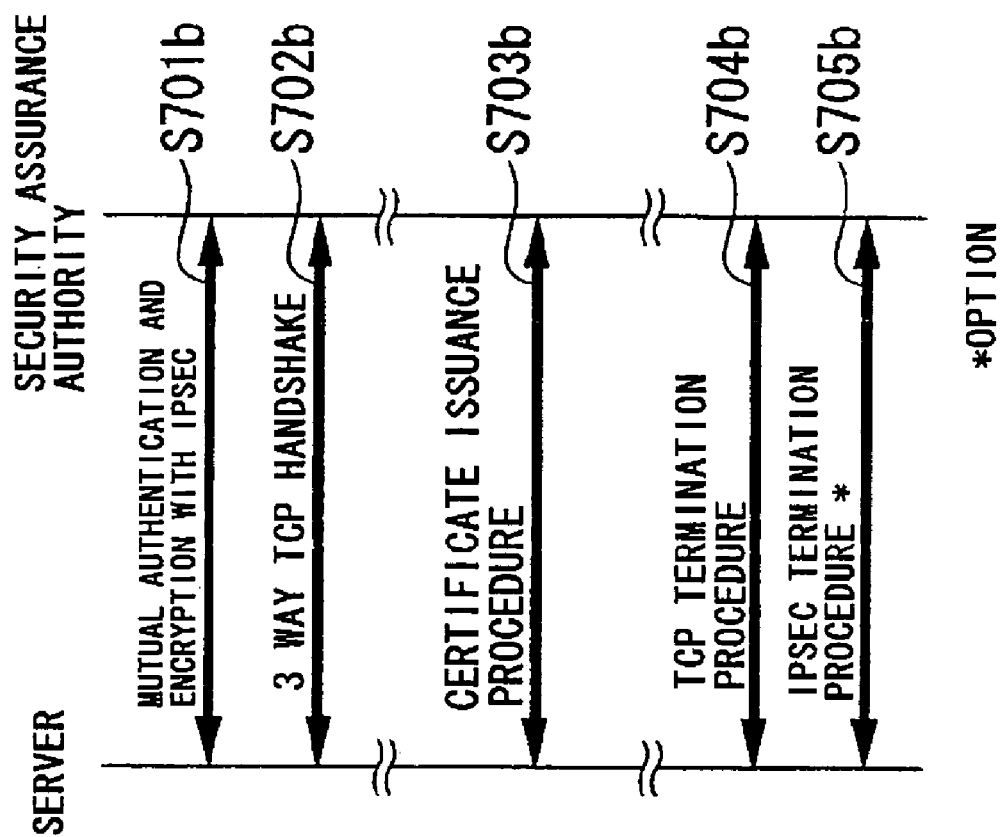
FIG. 7B is a sequence diagram showing a communication sequence in another variant example of the embodiment of the present invention.
Figure 7A:
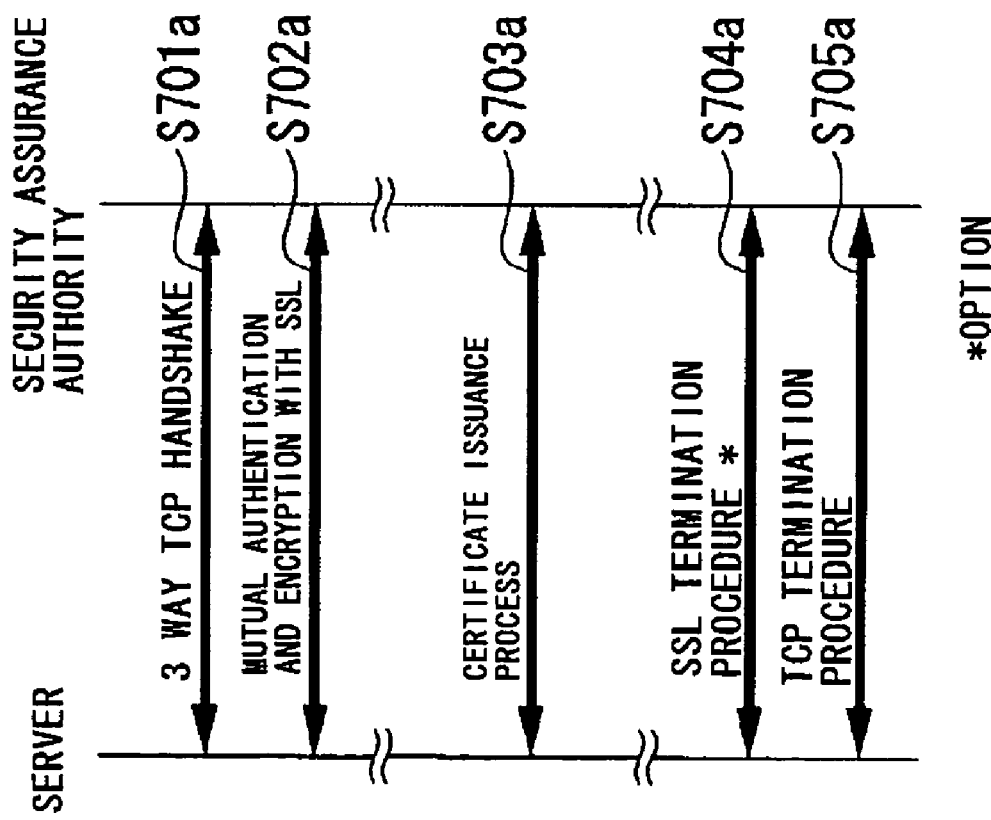
FIG. 7A is a sequence diagram showing a communication sequence in another variant example of the embodiment of the present invention.

FIG. 7 shows the mutual authentication and encryption communication sequence between the security assurance authority 2 and the server 3. This mutual authentication and encryption can be achieved by using a pre-existing protocol such as SSL (Secure Socket Layer) or IPsec or the like, and moreover, it is independent from the certificate issuance phase and it is acceptable to apply various types of mutual authentication and encryption protocol. FIG. 7a shows an example of a mutual authentication and encryption communication sequence using SSL. After a three-way handshake with TCP (in a step S701a), the security assurance authority 2 and the server 3 process mutual authentication and encryption using SSL (in a step S702a), and then perform a certificate issuance procedure which is described hereinafter (in a step S703a). Then a SSL termination procedure (in a step S704a) and a TCP termination procedure (in a step S705a) are processed, and thereby this mutual authentication and encryption finishes.

FIG. 7B shows an example of a mutual authentication and encryption communication sequence using IPsec. After mutual authentication and encryption using IPsec (in a step S701b), the security assurance authority 2 and the server 3 process a TCP three-way handshake (in a step S702b), and then a certificate issuance procedure which is described hereinafter is processed (in a step S703b). Then a TCP termination procedure is processed (in a step S704b) and an IPsec termination procedure is processed (in a step S705b), and then the mutual authentication and encryption finishes.

FIG. 8 shows an example of a communication sequence in the certificate issuance phase. FIG. 8A is a method in which communication procedure obtains trustworthiness at the application layer for the certificate issuance, while FIG. 8B is a method which indicates high speed because the trustworthiness is obtained by lower level communication layers. This method which obtains high speed is the method that is omitted the checking procedure from the method which obtains trustworthiness. In the following, the method which obtains trustworthiness will be explained as a basic method.

Since, in the communication for certificate issuance, it is necessary to exchange items of information of various formats and sizes, tag style enclosure is applied for this process, which are adapted to communication with free format text (a document structure in which the text called tag expressing the type of information is inserted between "<" and ">" or "<" and "/>", and text expressing the contents of information is inserted between pairs of tags). In other words, the data is sent and received in a format to which tags for information that is to be notified to the target party during communication are appended. The type of information is determined (recognized) by tags, and the contents of the information are determined (recognized) by referring to the text which is positioned between tags.

In a starting phase of mutual authentication and encryption (steps S801a and S801b), the server 3 notifies the security assurance authority 2 of the start of the communication phase for issuance of a security certificate. The server 3 transmits a starting packet to the security assurance authority 2, and notifies an issuance request for a security certificate (in a step S802a). As a response to this, the security assurance authority 2 returns a check packet to the server 3 (in a step S803a). FIG. 9 shows the contents of the starting packet and the check packet. The "*" character is an option (and the same hereinafter).

Next, in an update and state notification phase, the server 3 notifies information which is in connection with security countermeasures and which has been updated to the security assurance authority 2 using update and state notification packets (in a step S804a and the step S802b). The information included in this update and state notification packet is state information (notification information) which specifies the state of the security countermeasure systems, and is collected by an internal checking module 39. The security assurance authority 2 receives this update and state notification packet and returns a check packet to the server 3 (in a step S805a). FIG. 10 shows the contents of the update and state notification packet and the check packet.

In FIG. 10, the symbol "name" denotes the name of the OS or IDS, the symbol "version" denotes version information thereof, the symbol "pattern" denotes an identifier for notifying patch or pattern file information. The symbol "UP" denotes information which has been updated, while elements in which only numerical values or text information are written, but to which this symbol is not appended, denote current items which have not been updated. Although examples of tags such as VDS and the like are not shown (for example: <status-vds>), in this case, this means that there is no VDS, or that, in relation to VDS, there is no requirement for assurance.

Each of the servers includes information both about the current state and the updated state in the information which is notified to the security assurance authority 2, due to that the security assurance authority 2 assures the security state of a large number of servers, and it is preferable for the security assurance authority 2 not to manage the state history of each of the servers. By doing this, the security assurance authority 2 is able to decide whether or not to issue security certificates on a unit by unit issuance request basis. If the security assurance authority obtains a history management function for the state of each server, then it is possible for the security assurance authority 2 to decide whether or not to issue certificates by receiving notification of only update information from each of the servers. The public key information of each server which has received a signature is also notified (refer to <pub-key>***</pub-key>).

Next, in an internal checking instruction phase, the security assurance authority 2 requests to the server 3 the items for which internal checking must be processed (in steps S806a and S806b), and the server 3 reports the results of checking according to this request (in steps S807a and S804b).

Upon receipt of this report, the security assurance authority 2 transmits a check packet to the server 3 (in a step S808a). FIG. 11 shows the contents of the internal checking instruction packet, the internal checking result packet, and the check packet.

The result of this internal checking is state information which indicates the state of the security countermeasure systems of the server 3, and it shows the state of the security countermeasure systems in more detail than the state information (the notification information) which was notified by the server 3 to the security assurance authority 2 in the update and state notification phase. An instruction is given by the internal checking instruction packet to check the files which the server 3 is managing (for example: syslog) and the processes which are being activated (for example: ps command). Accordingly, the server 3 returns to the security assurance authority 2 an internal checking result packet which includes the information which has been requested as text information. If the size of the information to be returned becomes great, sometimes this information may also be separated into multiple packets.

According to circumstances, it may also happen that the server notifies only characteristics as hash values. Furthermore, the security assurance authority 2 may designate particular regions which must be returned, for example, the regions which must be returned may be shrunk by notifying keywords or time instant information to the server 3.

Next, in the external checking phase, an external check is processed with attack packets or the like from the security assurance authority 2 to the server 3 (in the steps S809a and S805b).

In the external checking instruction phase which follows on from the external checking phase, the security assurance authority 2 transmits an external check instruction packet to the server 3, in order to collect the results of external checking which have been recorded on the side of the server 3 (in the steps S810a and S806b). The server 3 transmits an external check result packet which includes the results of the external checking as text information to the security assurance authority 2 (in the steps S811a and S807b). Upon receipt of this external check result packet, the security assurance authority 2 transmits a check packet to the server 3 (in the step S812a).

FIG. 12 shows the contents of the external check instruction packet, the external check result packet, and the confirmation packet. In order to collect the log information which is recorded in the IDS or the like, the information which is to be collected is designated by the external check instruction packet. The external checking is not limited to being processed from the security assurance authority 2. Furthermore, the timing of processing of checking may be varied. Yet further, the information in the result log and the like may become quite great in size. Due to these facts, it is necessary to specify the regions of the external checking result which should be collected, and, using the external check instruction packet, the security assurance authority 2 notifies information which specifies IP addresses, time instants, keywords or the like for which external checking has been processed. And the server 3 returns the information which has been designated as the external check result packet, which is text information. According to circumstances, it may be the case that only characteristics are returned as hash values.

Next, in the security certificate phase, if the results of the internal checking and the external checking shows that the security countermeasures are being properly set to the server 3, the security assurance authority 2 issues a security certificate and returns it to the server 3 (in steps S813a and S808b). If, on the other hand, the security countermeasures are not being properly set to the server 3, or if the information from the server 3 has not been received accurately, then the security assurance authority 2 returns error information (an unfinished countermeasure notification packet). Upon receipt of the security certificate, the server 3 transmits a confirmation packet to the security assurance authority 2. FIG. 13 shows the contents of a security certificate packet and of an unfinished countermeasure notification packet.

To the security certificate, the IP address and the name of the issuer, the version number, the method of signature, the year-month-day of issuance of the signature, the period of validity, the name of the server, the public key information for the server, and the security level are appended. According to circumstances, information which indicates that the state of the OS or the IDS/VDS is correct may also be included. Furthermore, as is described hereinafter, information related to the state of the OS or the IDS/VDS may also be embedded with the public key of the security assurance authority 2. The security assurance authority 2, by decoding this information with its own secret key, extracts the information which indicates the state of the server 3 and processes checking of validity of security certificate one by one.

The signature information is appended at the tail end of the security certificate. As this signature information, there is a signature which indicates the state of the OS or the IDS, and a signature which indicates the validity of the entire security certificate. If the state of the OS or of the IDS is written in plain text, security countermeasure information (information which indicates the type of security countermeasures and the like, showing what type of security countermeasures are being applied to) may be made public by a malicious intruder, therefore, the security assurance authority 2 appends a safety index (refer to: <level>***</level>) to the security certificate, which increases the degree of abstraction of the security countermeasure information. The security assurance authority 2 manages a correspondence table of the security countermeasure information and the safety index, and determines upon the safety index of the server 3 based upon the security countermeasure information which has been notified from the server 3. If it has been decided that the result of external checking is that the security countermeasures of the server 3 are not adequate, then the security assurance authority 2 notifies the server 3 the problem spots by an unfinished countermeasure notification packet. Next, the communication is finished via a mutual authentication and encryption termination phase (in steps S815a and S809b).

In this variant example, the security assurance authority 2 issues the security certificate, but, in the same manner as with the variant example described above, it would also be acceptable to arrange for the server 3 to transmit a dummy security certificate to the security assurance authority 2, and for the security assurance authority to execute a signature upon this security certificate. Communication in this case as well is performed by using tag style enclosure, in the same manner as in this variant example.

Next, the communication protocol between the server 3 and the client 4 will be explained. FIG. 14 shows the communication sequence between the server 3 and the client 4. FIG. 14 shows that a certificate request application processes over the TCP layer. FIG. 14A shows a method which obtains high trustworthiness in the communication procedure, while FIG. 14B shows a method which obtains high speed, in which a checking procedure is omitted.

After a TCP three way handshake (in steps S1401a and S1401b), mutual authentication and encryption (not shown in the figure) is processed, and then, in the method which obtains high trustworthiness, sending and reception of a starting packet and a confirmation packet is processed (in steps S1402a and S1403a). Next, the client 4 transmits a certificate request packet to the server 3 (in steps S1404a and S1402b). Upon receipt of this certificate request packet, the server 3 transmits (in steps S1405a and S1403b) a security certificate packet to the client 4, based upon the request for the certificate request packet.

FIG. 15 shows the contents of the certificate request packet and the security certificate packet. In the security certificate packet, as text, information such as the name of the issuer, the version, the signature method, the date and time effective, the period of validity, the name of the server, the security level, and the like are included. According to circumstances, information for notifying that the state of the OS or the IDS is correct may also be included (refer to: <os-status>*</os-status> and <ids-status>*</ids-status>). Finally the signature information of the security assurance authority 2 is appended (refer to: <hash>***</hash>).

In this method which obtains high trustworthiness, upon receipt of the security certificate packet, the client 4 transmits a confirmation packet to the server 3 (in a step S1406a). Next, the TCP termination procedure is performed, so that this procedure finishes (in steps S1407a and S1404b).

Next, the communication protocol between the security assurance authority 2 and the client 4 will be explained. Verification of the security certificate on the side of the client 4 is processed upon the following two levels, from the point of view of decreasing the processing load, and of trustworthiness in relation to security.

Level 1: Local verification using the public key of the security assurance authority 2, which has been previously acquired.

Level 2: On-line verification inquiring to the security assurance authority 2, in order to check the state of abrogation of the security certificate.

In order to construct Level 1, in the same manner as in the case of a pre-existing PKI model, by the client 4 acquiring and keeping the public key certificate of the security assurance authority 2 in advance, it becomes possible to verify the validity of the signature which is affixed to the security certificate. The client 4 does not require external communication, therefore, processing load is small.

However, if an unknown attack or virus has newly appeared and started its operations, a requirement arises to check the validity of the security certificate. Even for a security certificate which is still within its period of validity, it is thinkable that a client may try to request the check of the state of abrogation to the security assurance authority 2 upon a frequent basis. Here, Level 2 on-line verification becomes necessary, which places a high emphasis upon trustworthiness. In the following, a technique for implementation of the Level 2 method will be explained. FIG. 16 shows the Level 2 communication sequence between the client 4 and the security assurance authority 2. FIG. 16*a* is a method which is obtains trustworthiness in the communication procedure, while FIG. 16B is a method which obtains high speed, since the checking procedure is omitted.

After a TCP three way handshake (in steps S1601*a* and S1601*b*), mutual authentication and encryption (not shown in the figures) is processed, and, in the method which obtains high trustworthiness, sending and receipt of a starting packet and a confirmation packet are processed (in steps S1602*a* and S1603*a*). Next, the client 4 transmits the security certificate which it has received from the server 3 to the security assurance authority 2, and requests a check upon the validity of this security certificate (in steps S1604*a* and S1602*b*).

Upon receipt of this security certificate, the security assurance authority 2 decodes, using its secret key, the state information for the OS and/or the IDS which has been signed in the security certificate with its own public key, checks its validity, and returns the result of validity checking to the client 4 (in steps S1605*a* and S1603*b*). At this time, in order to assure the client 4 that this is information from the security assurance authority 2, for all of the packets which are returned, the information is transmitted after having been signed with the secret key of the security assurance authority 2. FIG. 17 shows the contents of a result packet, which is the result of checking the contents and the validity of the security certificate packet. In this method which obtains high trustworthiness, upon receipt of this packet which gives the check result, the client 4 transmits a confirmation packet to the security assurance authority 2 (in a step S1606*a*). Next, a TCP termination procedure is processed (in steps S1607*a* and S1604*b*), and then this procedure finishes.

Next, the technique for issuance and abrogation of security certificates by the security assurance authority 2 will be explained. In prior art PKI, the certificates which have been issued by each of the servers are managed with serial numbers (the previously described certificate IDs). The period of validity of each certificate is set in units of several years, and once a certificate has been issued, it is hardly ever abrogated within its period of validity. Accordingly, the frequency of issuance (updating) and of abrogation is low, and it is possible to manage the various histories with serial numbers. Management of certificates is implemented by recording these serial numbers in a CRL (Certificate Revocation List).

However, in the case of the security certificates of this embodiment of the present invention, every time a new attack or virus has been discovered, the setting files for the OS and/or the IDS/VDS need to be updated, so that the frequency of issuance (updating) and abrogation is high, and the security assurance authority 2 is required to manage the states of a very large number of security certificates. In the following, the application of a management technique using a prior art CRL is investigated, however, it is also necessary, on the side of the security assurance authority 2, to investigate management techniques which do not require it to perform management of the history of the security certificates which have been issued.

In the following, a method will be explained with which by, among the security certificates, providing security countermeasure information of the server 3 only to those which the security assurance authority 2 can read, the security assurance authority 2, simply by referring to the security certificate, can make a decision as to its validity (state of abrogation). This is a technique in which the security countermeasure information for the server 3 is encrypted and stored within the security certificate, in order for it not to be acquired by the client; and this is a method in which security is given great weight, in consideration of malicious client countermeasures.

Furthermore, in the case of this embodiment of the present invention in which it is necessary to check frequently upon the validity of the security certificates, the frequency at which the client 4 issues enquiries to the security assurance authority 2 becomes high, so that there is also a possibility of congestion upon the side of the security assurance authority 2. Accordingly, rather than managing the security certificates which have been issued on an individual basis, it is also necessary to investigate a technique of deciding upon their validity in groups.

In the following, with the objective of decreasing processing load of abrogation, a technique will be explained in which abrogation for security certificates of the same type is processed all together, by issuing security certificates of the same type to servers upon which OS and IDS/VDS of the same type are applied. By doing this, it is possible to expect that the abrogation decision procedure for security certificates will be simpler.

First, the case is explained in which the management technique for security certificates applying a CRL to this embodiment of the present invention. The security assurance authority 2 appends an individual serial number to each security certificate which is issued. When abrogating a security certificate, the security assurance authority 2 records its number in the CRL. This technique is the same method for implementing abrogation management as in the prior art PKI model. In this case, it is not necessary to append information relating to the OS and/or the IDS/VDS to the security certificate. When deciding upon the validity of a security certificate, the abrogated certificate management section 29 of the security assurance authority 2 retrieves the serial number which is appended to the security certificate from the serial numbers within the CRL, and if the serial number of the security certificate matches with a serial number within the CRL, then it decides that this security certificate is in a state of abrogation (i.e., is not valid).

Next, a technique will be explained in which security countermeasure information (information which specifies the type and so on of security countermeasures, i.e. which shows what type of security countermeasure is being implemented) for the server 3 is stored within the security certificate, in order that it can only be read by the security assurance authority 2. By embedding security countermeasure information for the server 3 in a security certificate which is issued from the security assurance authority 2 with a technique which ensures that it can only be read by the security assurance authority 2, it becomes possible, simply by referring to the information in the security certificate, for the security assurance authority 2 to make a decision upon its validity, even if a query has been made with regard to its validity. What must be given great attention to here is that the information such as the name and the version of the OS and/or the IDS/VDS and so on are not directly embedded within the security certificate (in a format which can be read by anybody).

When issuing a security certificate, the server authentication section 25 of the security assurance authority 2 deals with the name and version of the OS and the IDS/VDS which have been notified from the server, the pattern file information and random numbers for padding as one unit of information which is appended to the security certificate as security countermeasure information, and processes encryption of this unit of information with its own public key. And the security assurance authority 2 appends the encrypted data which has been obtained by this encryption, to the security certificate. The circumstances of encryption are specified in FIG. 13 and so on by the certificate tags <secret-os>**</secret-os> or <secret-ids>*</secret-ids>.

The security assurance authority 2 does not manage the serial numbers of the various security certificates on an individual basis, but rather stores the version of the OS and the IDS/VDS, which specifies the type of security countermeasure, and information which specifies the validity thereof, in mutual correspondence in a table (an abrogation information table) in its memory section 28. When deciding upon the validity of a security certificate, the server authentication section 25 decrypts the encrypted security countermeasure information which is included in the security certificate, using the secret key of the security assurance authority 2. And the server authentication section 25 reads the abrogation information table from the memory section 28, and decides upon the validity of the security certificate by retrieving the contents of the security countermeasure information which has been obtained by decryption. In other words, if the version of the OS or the like which is specified by the security countermeasure information which is included in the security certificate is shown in the abrogation information table as having been abrogated, then the server authentication section 25 decides that this security certificate has been abrogated.

Since, according to this technique, the security assurance authority 2 is no longer required to manage the serial numbers of a very large number of security certificates upon an individual basis, accordingly it is possible to reduce the cost of management by the security assurance authority 2, since the volume of records which must be maintained by the security assurance authority 2 is substantially reduced. Furthermore, since the security countermeasure information for the server 3 is appended to the security certificate after having been encrypted, accordingly it becomes possible to reduce the danger of leakage of the security countermeasure information of the server 3.

Next, a technique will be explained of abrogating the security certificates of one type all together. The server authentication section 25 issues security certificates having the same type of identification information to multiple servers to which the same type of OS and IDS/VDS is applied. And the server authentication section 25 appends a serial number by which the type of security countermeasures may be recognized to the security certificate. The type of security countermeasure is indicated by the versions of the OS and/or the IDS/VDS.

The abrogation information table is stored in the memory section 28, and, in this table, the type of security countermeasures and their serial numbers are stored in correspondence to information which indicates their validity. The server authentication section 25 retrieves the serial number of the security certificate for the server 3 which has been received from the client 4 from the serial numbers in the abrogation information table which has been read from the memory section 28. If the same serial number is detected, then the server authentication section 25 decides upon the validity of this version, based upon the contents of the abrogation information table. If this version is in a state of abrogation, then the server authentication section 25 decides that this security certificate is in a state of abrogation (is not valid).

The timing at which the security certificate is abrogated is when the version of the OS of the security certificate is updated within its period of validity, or when the detection pattern file of the IDS/VDS is made public. As described above, since security certificates which have the same contents (related to the type of security countermeasures) are issued for multiple servers which have security countermeasures of the same type, it is possible to abrogate all the security certificates for each type of security countermeasure of the OS, IDS, and VDS all together.

This abrogation is managed with the serial numbers within the security certificates, which are generated for each type of security countermeasure. With this technique, the abrogation information which is published from the security assurance authority 2 is only the serial numbers of the security certificates which have come to be abrogated within their periods of validity. Serial numbers are appended for each type of security countermeasure to the spots of the information which are indicated, in the security certificate shown in FIG. 13 etc., by <secret-os>*</secret-os> or <secret-ids>*<secret-ids>. In this case, a serial number for the entire security certificate becomes unnecessary.

Figure 18:
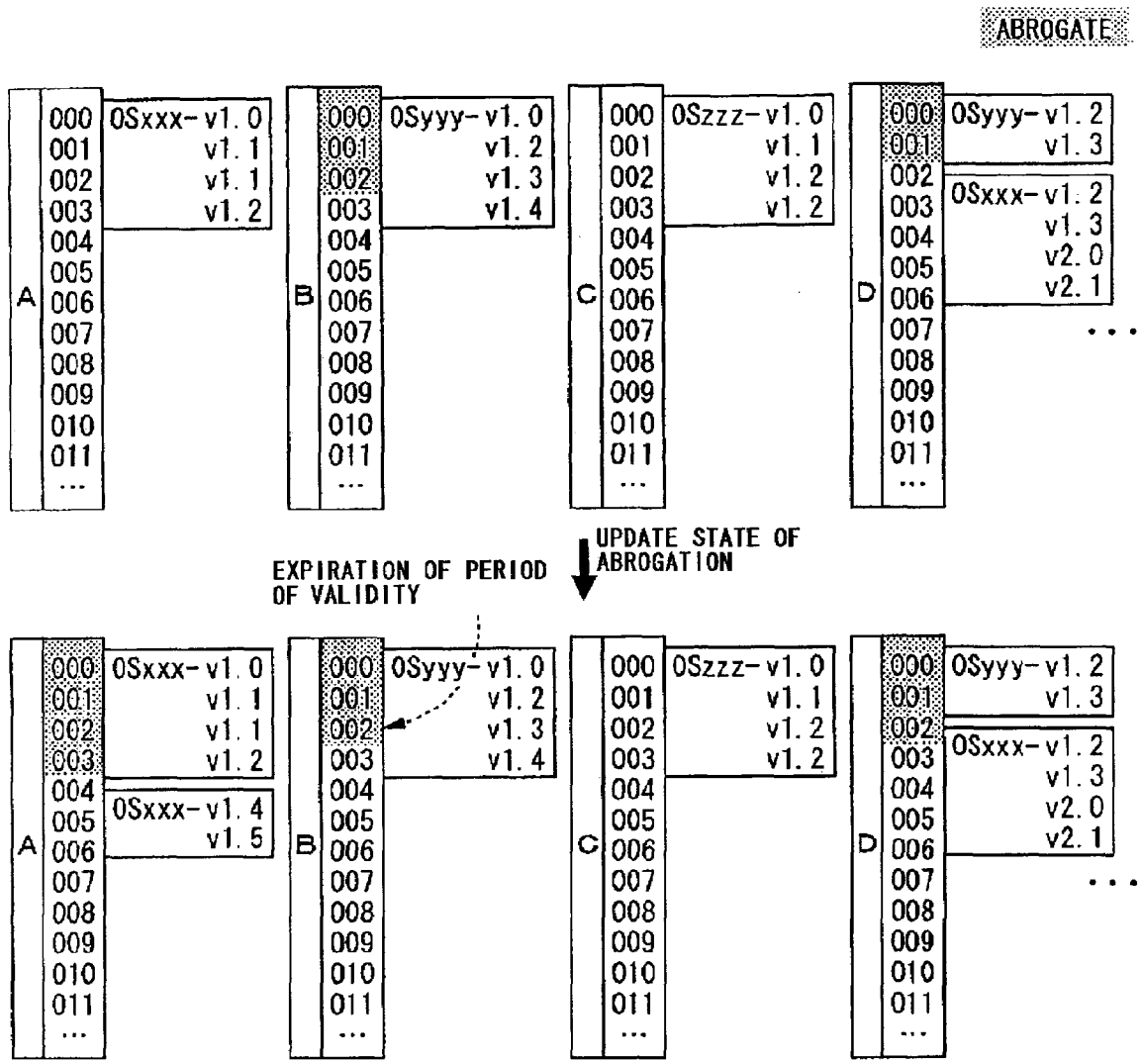
FIG. 18 is a reference figure showing the contents of a validity information table in another variant example of the embodiment of the present invention.

In the following, a technique for making it difficult to infer the security countermeasure information from the serial number which is appended to each type of security countermeasure is explained by taking the type and version of the OS as an example. There are multiple types of OS, and also there are various versions of each type. FIG. 18 shows the situation of the abrogation information table which manages the serial numbers and states of abrogation of the OS, and also their version information. This table is created and is managed by the abrogated certificate management section 29 of the security assurance authority 2. Furthermore, this table is stored in the memory section 28.

The serial number is made up of group IDs which consist of A, B, C, . . . , and numerical values in ascending order. With regard to the states of abrogation, if some numerical value in some group has been abrogated, then all of the numerical values less than that numerical value within the same group are abrogated. For example, if up to 004 in group D have been abrogated, then all of the security certificates which are in correspondence to all of the lower numerical values (000~003) in that group D are also abrogated. In FIG. 18(a), the security certificates which are in correspondence to 000~002 of group B and to 000~001 of group D are all abrogated. In the abrogation information table, the information is included that 002 of group B and 001 of group D are abrogated. Since all of the numerical values less than these numerical values are abrogated, it is not necessary to provide information (flags or the like) to indicate whether or not the certificates which correspond to all these values in ascending order are abrogated. Due to this, the size of storage or memory which is required in the security assurance authority 2 is reduced, and thus it is possible to reduce the management cost of the security assurance authority 2.

In order to make it difficult to infer the security countermeasure information, it is arranged to perform management using a plurality of group IDs and a plurality of numerical values, even for the same OS and version. In FIG. 18, the situation is shown in which OSxxx and OSyyy are being managed with a plurality of groups, and the situation is shown in which OSxxx-v1.1 and OSzzz-v1.2 are being managed with multiple numerical values. Even for servers applying the same OS and version, it also happens that, according to the security certificates, the group IDs and numerical values in ascending order can be different, and that, in this case, it is not possible to recognize that they have the same settings as one another. The difficulty of such inference depends upon the number of group IDs and the number of numerical values in ascending order.

If up to version 1.3 of OSyyy are in a state of abrogation (FIG. 18(*a*)), then 000~001 of group D are abrogated. For group D and above, management by a different OSxxx is assigned. Furthermore suppose that, as time progresses, up to version 1.2 of OSxxx are abrogated (FIG. 18(*b*)). At this time, up to 003 of group A are all in the state of having been abrogated, while it is possible to assign a different OSyyy to A-004 and above.

In the situation of FIG. 18(*a*), A-003 is not abrogated, and in this state, when a different OSyyy is assigned to A-004 or later, there is the possibility that this OSyyy can be abrogated before the OSxxx-v1.2. Accordingly it is arranged, after the state shown in FIG. 18(*b*), the different OSyyy is assigned to A-004 or later. When the abrogated certificate management section 29 assigns the numerical values in ascending order of serial numbers, as described above, in a case that the version to which some numerical values in ascending order is appended has been abrogated, then the numerical values in ascending order are appended so that the versions in the same group to which numerical values in ascending order lower than that numerical value have been appended satisfy the relationship that they are all in a state of abrogation.

There is a possibility that a malicious server applies to the security assurance authority for various OS and version information in order to collect a large number of certificates, and to infer the correspondence table of the serial numbers. The security assurance authority 2 can protect against this type of attack by limiting the issuance frequency of security certificates.

The security assurance authority 2 manages the serial numbers and the date and time information when these numbers were finally issued. Based upon this date and time information, the volume of abrogation information may be reduced by not making public the serial numbers of security certificates whose period of validity has expired. In FIG. 18(*b*), B-002 is a serial number which has been allocated to a security certificate whose period of validity has expired, while A-003 and D-002 have been made public from the security assurance authority 2 as abrogation information.

According to the above described technique, it is possible to determine the validity of security certificates which have the same contents related to the type of security countermeasures by the numerical values which are prepared group by group, and it is thereby possible to reduce the processing load upon the security assurance authority 2. Furthermore, by making public the group IDs and the numerical values in ascending order of the OS versions which have been abrogated, it is possible to process the abrogation decisions for security certificates simply and easily even upon the client side.

Furthermore, it is possible to make it difficult to infer the security countermeasure information for a server by assigning multiple combinations of group IDs and numerical values in ascending order to the same versions of OSs and IDS/VDSs and the like. Yet further, as previously described, it is possible to make the size of the security certificates small, as compared to the technique of embedding the security countermeasure information for the server 3 in the security certificates which the security assurance authority 2 encrypts.

It should be understood that it would also be acceptable to apply the technique of issuance and abrogation of security certificates which has been explained in this variant example of the present invention, in the previously described variant examples as well.

Next, a technique will be explained for achieving the anti-tampering action of the internal checking module 39 of the server 3. For assuring the contents of the security certificates, the function of the internal checking module 39 is extremely important. If the procedures related to the internal checking module 39 are attacked, irrespective of whether or not the IDS 32 and/or the VDS 33 are stopped, if the server 3 returns a security certificate to the client 4, the trustworthiness of the PKI base model of this embodiment comes to be lost, which is undesirable.

As an example of an attack, (i) there is an attack in which the OS itself of the server 3 upon which the internal checking module 39 is activated is attacked and taken over and the OS returns false information to the internal checking module 39. Furthermore (ii), an attack may be considered in which, by the internal checking module 39 itself being attacked and being masqueraded, false information is exchanged with the security assurance authority 2, or a false security certificate is returned to the client 4. Thus, in this variant example of the present invention, two techniques are proposed and in which the anti-tampering of the internal checking module 39 that fulfils the most important role is achieved, in one technique, it is implemented using the TPM (Trusted Platform Module) technique which has been explored by the TCG (Trusted Computing Group), and in another technique, a smart card (an IC card) is applied for of implementing it.

First, the TCG is explained. The TCG is an industry standardization group whose objective is to implement an environment for executing applications, from the hardware to the BIOS and OS, as a platform which can be trusted. In concrete terms, it is proposed to assemble a hardware chip into a computer, and to store in this hardware chip secret information (encryption keys and so on) which cannot be improperly actuated from software. This chip is termed a TPM. In another word, it is a so-called internal security chip within the computer.

As functions which are to be implemented by such a TPM, the basic requirements are given as follows:

(1) Assessing the integrity of the platform: a function of storing hash values for software, in order to detect falsification of the BIOS, of the OS, or of software.

(2) Authenticating the platform: a function of creating and storing a secret key which is stored within the TPM for guaranteeing that an authorized TPM is used.

(3) The protected memory region: a function of protected storage, for keeping the secret key safely.

(4) Coprocessor for encryption processing: a function of calculating public key encryption, random number generation, and hash calculation for performing encryption procedures safely.

By the TPM being provided with the above described functions, as shown in FIG. 19, by taking the fitting position of the TPM as a trust point, it becomes possible to check the integrity of the OS, the boot loader, the BIOS, and so on, and the reliability is maintained (the chain of trust). For example, if the hash value of the OS or the like is stored in the TPM, then it is possible to detect the presence of falsification of the OS or the like by comparing it with the hash value within the TPM which cannot be falsified, since, if the OS or the like has been falsified, its hash value will have been changed.

On the other hand, a smart card (also called an IC chip) is a plastic card of the size of a credit card, in which IC chips such as a CPU, a memory, a security circuit and the like are included. If such a smart card experiences a physical attack externally, the chip itself is destroyed. Furthermore, the program which must be protected is stored in a ROM, therefore, it is impossible for external software or the like to rewrite this program. Yet further, with such a smart card, there is the beneficial aspect that it is possible to store important information in encrypted form, and the like. A smart card which is used in the security assurance infrastructure is made in a format which can be inserted into an interface of the server 3, and such a smart card obtains a calculation capability for encryption or the like, a memory region for secret information, and a communication function and the like.

The secret information which is to be protected in the server 3 in which a security chip is fit internally, and the information which is indirectly protected based upon this secret information, are enumerated below. By the way, taking the security chip as a trust point, the information which is protected indirectly by the chain of trust is managed in a normal memory region (a hard disk or the like).

If the memory region of the TPM or smart card, its calculation processing capability, and its communication capability are high, then the information which should be protected and the information which is protected by the chain of trust are as shown in FIG. 20*a*. If the capability of the security chip is high, then, apart from the BIOS, the boot loader, the OS, and so on, it is also possible to implement the processing circuit itself which implements the functions of the internal checking module 39 and the communication interface (the communication module 40) within the security chip. Furthermore, if the memory region of the TPM or smart card, its calculation processing capability, and its communication capability are low, then the information which should be protected and the information which is protected by the chain of trust are as shown in FIG. 20B. If the capability of the security chip is low, then, the processing circuit itself which implements the functions of the internal checking module 39 and so on is constituted by hardware which is separate from the security chip, and hash values for the internal checking module 39 and so on are stored within the security chip.

Figure 21:
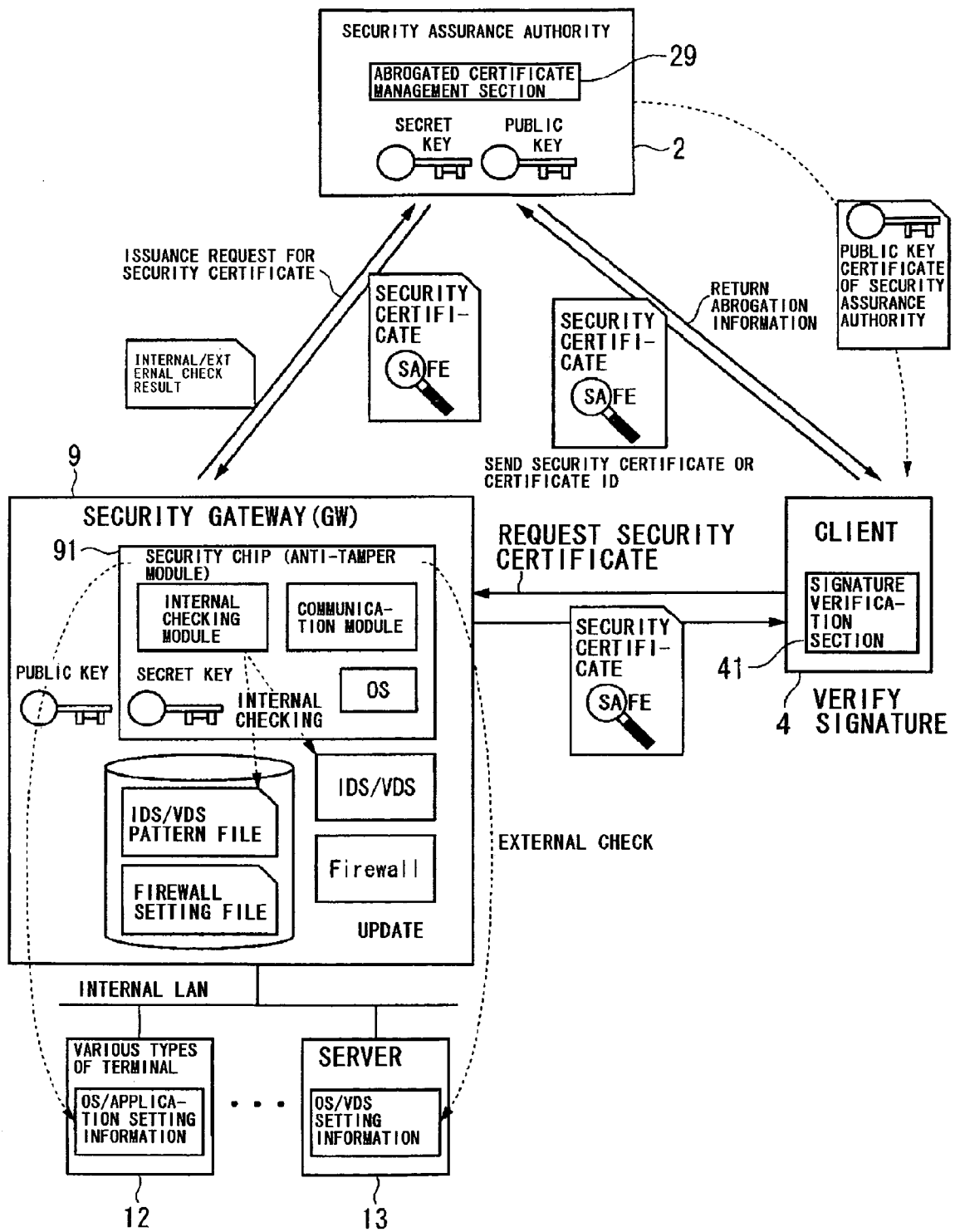
FIG. 21 is a block diagram showing the structure of a communication system according to another variant example of the embodiment of the present invention.
Figure 22:
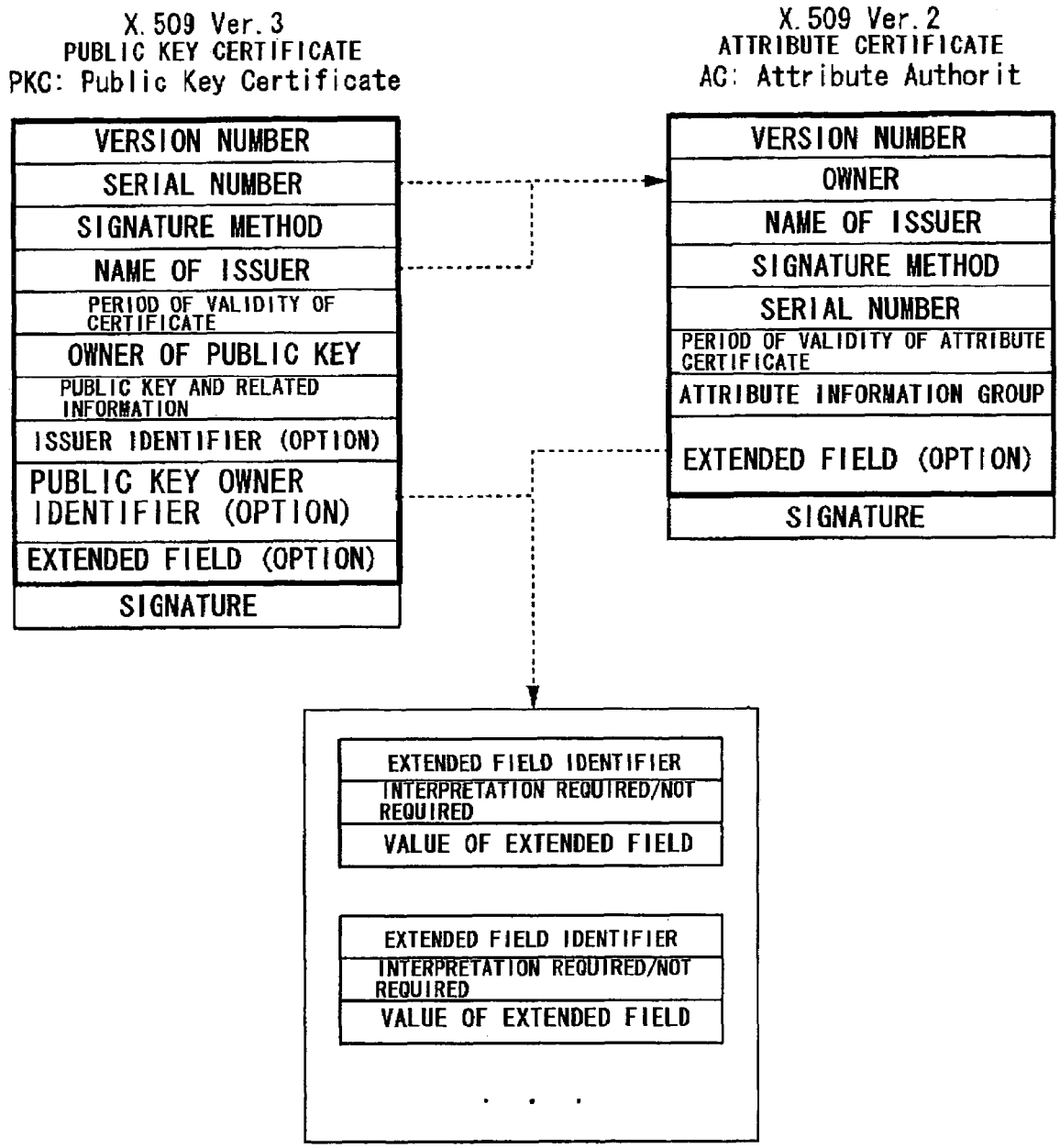
FIG. 22 is a reference figure showing the data structures of a public key certificate and attribute certificate according to a related art.
Figure 23:
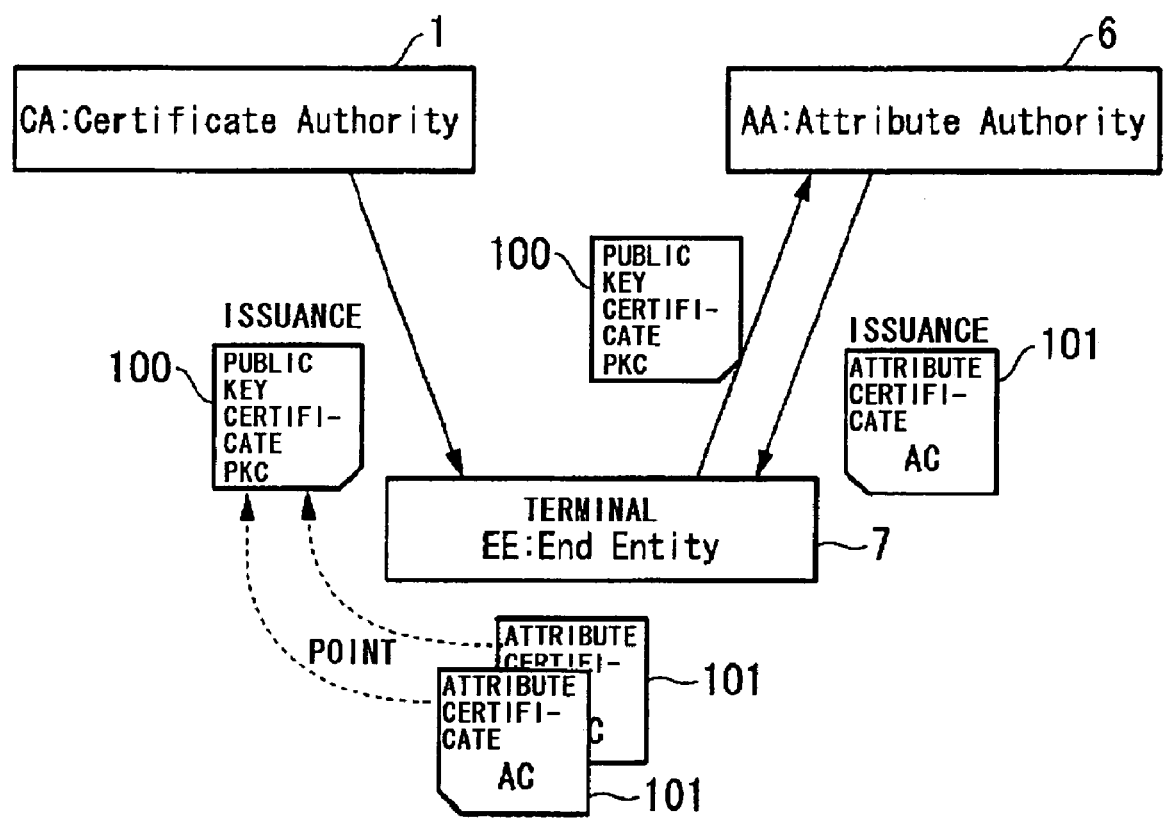
FIG. 23 is a reference figure showing the issuance and setting relationship of a public key certificate and an attribute certificate by an certification authority and an attribute authority according to the related art.
Figure 25:
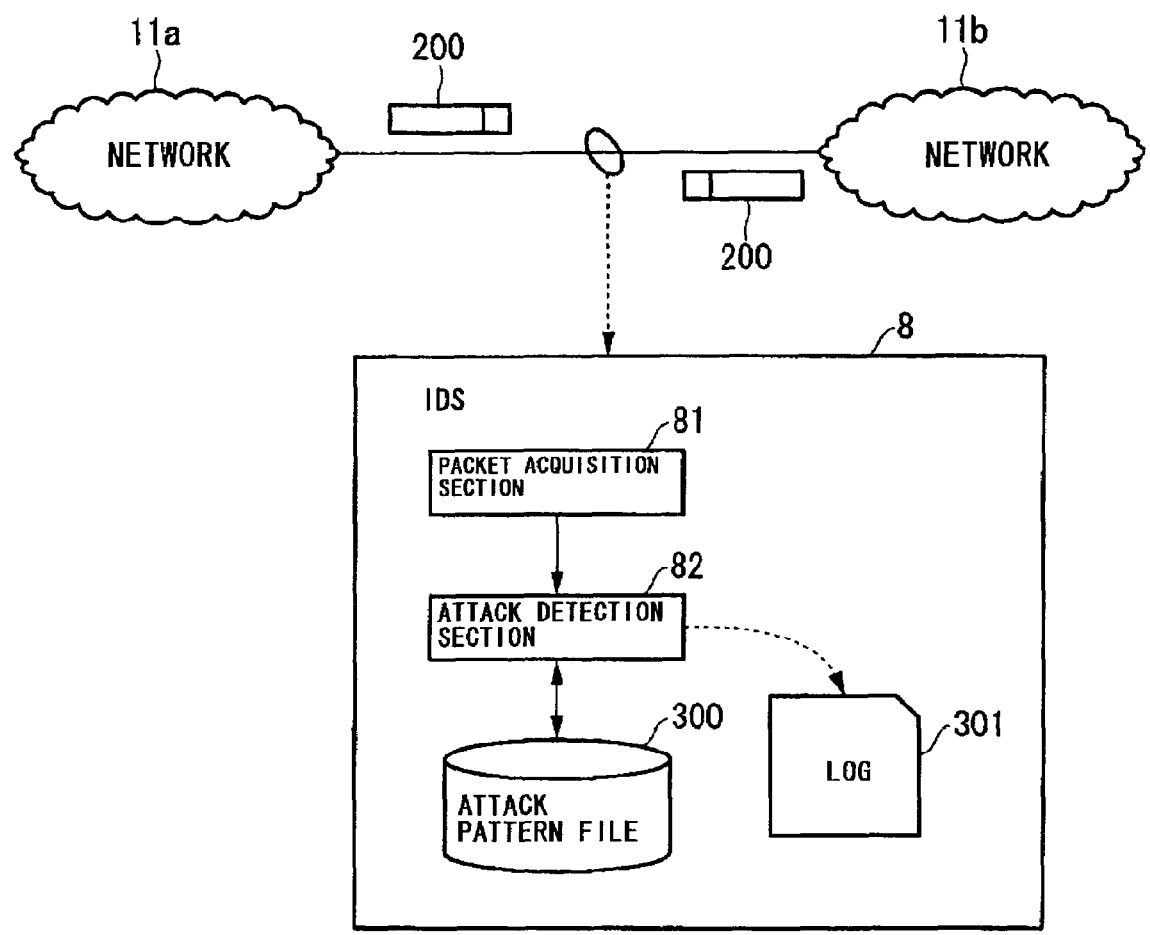
FIG. 25 is a block diagram showing the structure of an IDS according to the related art.

Next, an example of the implementation of a module which provides anti-tampering action for a security GW (gateway) will be explained. For constructing a trust point using a TPM or smart card, rather than implementing the security chip upon the server, it can be implemented more simply and easily by implementing the broadband router or a home GW to provide a security GW. FIG. 21 shows the structure of a communication system when the security chip has been implemented in a security GW.

In the figure, a high performance security chip 91 is implemented in a security GW 9, and the OS, the internal checking module, the communication module, and the secret key of the security GW 9 itself are managed by the security chip 91. The communication procedure between the security assurance authority 2 and the client 4 is performed via the communication module which is provided within the security chip 91. The internal checking module monitors the state of the IDS/VDS of the security GW itself. Furthermore, the security chip 91 monitors, by external checking, the OSs and applications of various types of device which are connected to the LAN (such as various types of terminal 12 and server 13 and so on in FIG. 21), and, according to circumstances, the state of the VDSs and so on.

It should be understood that it would also be acceptable to apply the technique for anti-tampering action of the internal checking module 39 which has been explained for this variant example to the variant examples described previously.

As described above, in this embodiment of the present invention, the server 3 transmits to the security assurance authority 2 the information necessary for AC issuance 104 related to the IDS 32 or the VDS 33 which specifies its own security level (its security during communication). The security assurance authority 2 verifies the security level of the server 3 (its security during communication) based upon the information necessary for AC issuance 104, and, if the security level is confirmed, AC 105 is issued and transmitted to the server 3.

Furthermore, if there has been a connection request from the client 4, the server 3 transmits the AC 105 to the client 4, and the client 4 verifies the security level of the server 3 based upon the AC 105.

By the actions above described, the client 4 is able to distinguish from the AC 105, before communication with the server 3, that the security level of the server 3 has been proved by the security assurance authority 2, which is a third party institution. Therefore, by endowing the security assurance authority 2, the server 3, and the client 4 with functions as described above, it becomes possible to assure that the target party for communication is taking appropriate security countermeasures, and accordingly it becomes possible to construct a safer network infrastructure.

Furthermore, according to another action of this embodiment of the present invention, the server 3 transmits the PKC 102 which specifies its correct identity (recognizability) to the security assurance authority 2, and the security assurance authority 2 verifies the correct identity of the server 3 based upon this PKC 102, and, if the correct identity and security level are confirmed, it issues an AC 105, and transmits it to the server 3. Furthermore, if there is a connection request from the client 4, the server 3 transmits a PKC 102 to the client 4, and the client 4 verifies the correct identity of the server 3 based upon this PKC 102. By the above described process, it is possible to more reliably ensure that the target party for communication is implementing security countermeasures.

Furthermore, according to yet another action of this embodiment of the present invention, the security assurance authority 2 and the server 3 processes cryptocommunication after having performed bi-directional authentication with a public key encryption method or a password authentication method, and the security assurance authority 2 controls the server 3 remotely, and acquires from the server 3 information which corresponds to the information necessary for AC issuance 104. Or, after the bi-directional authentication, the server 3 may transmit the information necessary for AC issuance independently to the security assurance authority 2. By doing this, along with obtaining the same beneficial effects as described above, also, it is possible to prevent a situation in which an issuance request for an AC is processed even in case a malicious server is not monitoring communication by the IDS or the VDS, therefore, accordingly it is possible to check and assure the security level of the server 3 more reliably.

Furthermore, according to still another action of this embodiment of the present invention, according to a program which possesses an anti-tamper characteristic by being obfuscated or the like, the server 3 creates state information which specifies the state of the IDS 32 or the VDS 33 and transmits it to the security assurance authority 2, and the security assurance authority 2 receives this state information, and verifies whether or not the contents of this state information matches with the contents of the information which is included in the information necessary for AC issuance 104. By doing this, it is possible to check and assure the security level of the server 3 more reliably.

Furthermore, according to even another action of this embodiment of the present invention, the security assurance authority 2 makes an attack upon the server 3 based upon the most up to date pattern file, and the IDS 32 or the VDS 33 of the server 3 detects this attack by the security assurance authority 2 based upon the most up to date pattern file which is stored in advance by being received from the security assurance authority 2 or the like, and records it in its log. The server 3 transmits its log to the security assurance authority 2, and, by verifying whether or not the attack upon the server 3 is recorded in the log, the security assurance authority 2 checks whether or not the server 3 is implementing security countermeasures based upon the most up to date pattern file. By doing this, it is possible to check and assure the security level of the server 3 more reliably.

Furthermore, according to a variant example of this embodiment of the present invention, by the server 3 checking upon the status of the IDS 32 and the VDS 33 and so on and issuing a dummy security certificate 109, and by the security assurance authority 2 processing signature upon this security certificate 109, if the security assurance authority 2 is managing a large number of servers 3, it is possible to reduce its processing load, since the issuance process for security certificates, which was previously performed by the security assurance authority 2, is now shifted to the side of the servers 3.

Furthermore, according to yet another variant example of this embodiment of the present invention, in communication which is performed between the security assurance authority 2 and the server 3 for issuance of a security certificate, to information which is notified to the target party for communication, a tag is appended which identifies this information. Since, by doing this, it is possible to discriminate the information without any dependence upon the order or the like of the tags which are contained in the data, accordingly it is possible for the security assurance authority 2 and the server 3 to exchange information of various formats and sizes with good efficiency.

Furthermore, according to still another variant example of this embodiment of the present invention, the security assurance authority 2 creates encrypted data by encrypting with its own public key upon security countermeasure information which specifies the type of security countermeasure of the server 3, and appends this encrypted data to the security certificate. If there is a request from the client 4 for a check of the validity of a security certificate, the security assurance authority 2 determines upon the validity of the security certificate based upon the security countermeasure information which it has obtained by decrypting the encrypted data which is appended to the security certificate with its own secret key. Since, by doing this, there is no requirement for the security assurance authority 2 to manage the individual serial numbers of a very large number of security certificates, accordingly the required storage or memory capacity for the security assurance authority 2 is reduced, and it is accordingly possible to reduce the cost of management by the security assurance authority 2. Furthermore, since the security countermeasure information of the server 3 is encrypted and appended to the security certificate, it is possible to reduce the danger of the security countermeasure information of the server 3 leaking.

Furthermore, according to even another variant example of this embodiment of the present invention, the security assurance authority 2 issues security certificates having the same serial number to multiple servers which have the same type of security countermeasures in place. To express this in another manner, the security assurance authority 2 appends a different serial number to security certificates for each type of security countermeasures. The security assurance authority 2 determines the state of abrogation of a security certificate, based upon an abrogation information table in which the serial numbers, the types of security countermeasures and the information of the validity (whether or not the certificate is in a state of abrogation) are linked, and based upon the serial number which is appended to that security certificate. By doing this, it is possible to reduce the load upon the security assurance authority 2 of determining the validity of the security certificates.

Furthermore, according to still yet another variant example of this embodiment of the present invention, a security chip such as a TPM or a smart card is implemented upon the server 3, and, by providing a processing circuit of the internal checking module 39 upon the security chip itself, or by storing a hash value of the internal checking module upon the security chip, it is possible to prevent the masquerade of the internal checking module 39, and it is accordingly possible to check and assure the security level of the server 3 more reliably.

Although embodiments of the present invention have been described above with reference to the drawings, the concrete structure of the present invention is not to be considered as being limited to these preferred embodiments; rather, design changes and the like are also included within the scope of the present invention, provided that its gist is not departed from. Thus, while preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication system comprising:
   a first communication device;
   a second communication device which communicates with the first communication device; and
   a security assurance device which assures security during communication between the first communication device and the second communication device, wherein:
   the second communication device transmits notification information for notifying a security level of the second communication device during communication to the security assurance device;
   the security assurance device receives the notification information via a control section, stores the notification information in a memory device, verifies the security level of the second communication device in a server authentication section during communication based upon the notification information, and, if the security level of the second communication device is confirmed, generates security assurance information which proves the security level of the second communication device during communication and transmits it to the second communication device;

the second communication device receives the security assurance information, and transmits the security assurance information to the first communication device according to a connection request from the first communication device; and the first communication device, after the connection request to the second communication device, receives the security assurance information from the second communication device, and verifies the security level of the second communication device during communication with the second communication device based upon the security assurance information.

2. A communication system according to claim 1, wherein:

the second communication device and the security assurance device process bi-directional authentication; and after the bi-directional authentication, the security assurance device transmits operation information for operation and control of the second communication device to the second communication device, and, along with receiving the notification information from the second communication device which has created the notification information based upon the operation information, verifies security during communication with the second communication device, based upon the notification information.

3. A communication system according to claim 1, wherein:

the second communication device and the security assurance device processes bi-directional authentication;

after the bi-directional authentication, the second communication device creates the notification information and transmits the notification information to the security assurance device; and the security assurance device receives the notification information and verifies security during communication with the second communication device, based upon the notification information.

4. A communication system according to claim 1, wherein:

the second communication device comprises a security countermeasure system;

along a program which possesses an anti-tamper characteristic, the second communication device checks status of the security countermeasure system, and creates state information which is related to the state and transmits the state information to the security assurance device; and the security assurance device receives the state information, and verifies the security during communication with the second communication device, based upon the notification information and the state information.

5. A communication system according to claim 1, wherein:

the second communication device comprises a security countermeasure system;

the security assurance device makes an attack upon the second communication device based upon pattern information which specifies most up to date attack pattern;

the security countermeasure system detects the attack by the security assurance device, based upon the pattern information which the security countermeasure system possesses in advance;

the second communication device transmits attack detection information which specifies that attack has been detected by the security countermeasure system to the security assurance device; and the security assurance device receives the attack detection information, and, instead of the notification information, verifies security during communication with the second communication device, based upon the attack detection information and the pattern information.

6. A communication system according to claim 1, wherein:

the second communication device comprises a security countermeasure system; and the notification information includes information which specifies that communication is being monitored by the security countermeasure system.

7. A communication system according to claim 1, wherein:

the second communication device further transmits to the security assurance device recognizability information which proves its own recognizability; and the security assurance device further verifies, upon receipt of the recognizability information, recognizability of the second communication device based upon the recognizability information, and, if recognizability and security during communication of the second communication device are confirmed, generates the security assurance information and transmits the security assurance information to the second communication device.

8. A communication system according to claim 1, wherein:

the second communication device further transmits, upon a connection request from the first communication device, recognizability information which proves its own recognizability to the first communication device; and the first communication device further receives, after the connection request to the second communication device, the recognizability information from the second communication device, and verifies recognizability of the second communication device, based upon the recognizability information.

9. A communication system according to claim 1, wherein:

the second communication device appends a tag for identification to the notification information, and transmits it to the security assurance device; and the security assurance device identifies upon receipt of the notification information, the notification information based upon the tag, verifies the security during communication of the second communication device based upon the notification information, and, if security during communication is confirmed, transmits the security assurance information to the second communication device.

10. A communication system according to claim 1, wherein:

the second communication device comprises a security countermeasure system, checks status of the security countermeasure system, and transmits state information which specifies the status to the security assurance device;

the security assurance device verifies upon receipt of the state information, the security during communication with the second communication device based upon the state information, and, if security during communication is confirmed, creates the security assurance information and transmits the security assurance information to the second communication device; and the second communication device comprises a means for checking state of the security countermeasure system within a security chip which has an anti-tampering characteristic.

11. A communication system according to claim 1, wherein:

the second communication device comprises a security countermeasure system, checks status of the security countermeasure system, and transmits state information which specifies the state to the security assurance device;

the security assurance device verifies, upon receipt of the state information, the security during communication with the second communication device based upon the state information, and, if security during communication is confirmed, creates the security assurance information and transmits it to the second communication device; and the second communication device comprises a hash value means which is for checking the state of the security countermeasure system and which is stored within a security chip which has anti-tampering characteristic.

12. A communication system, comprising:

a first communication device;

a second communication device which processes communication with the first communication device; and a security assurance device which assures security during communication between the first communication device and the second communication device, and wherein the second communication device transmits security assurance information which proves a security level of the second communication device during communication to the security assurance device;

the security assurance device receives the security assurance information via a control section, appends signature information to the security assurance information, and transmits the security assurance information to the second communication device;

the second communication device receives the security assurance information, and transmits the security assurance information with the signature information that is appended to the first communication device in response to a connection request from the first communication device; and the first communication device receives, after the connection request to the second communication device, the security assurance information from the second communication device, and verifies the security level of the second communication device during communication with the second communication device based upon the security assurance information and the signature information which has been appended to the security assurance information.

13. A communication system according to claim 1 or claim 12, wherein:

the security assurance information includes at least one among a group consisting of information which specifies the second communication device, information which specifies the security assurance device, information which specifies when the security assurance information was created, information which specifies period of validity of the security assurance information, various information which relates to algorithm for generating the security assurance information, information which indicates that the second communication device is monitoring communication with the security countermeasure system, information which specifies the security countermeasure system, and information which specifies a monitoring policy.

14. A communication system according to claim 1 or claim 12, wherein:

the first communication device requests the security assurance device to make judgment of validity of the security assurance information; and the security assurance device further makes judgment of validity of the security assurance information after receiving request from the first communication device.

15. A communication system according to claim 14, wherein the security assurance device further encrypts, along with storing abrogation information in which security countermeasure information which specifies the type of security countermeasure and information which indicates validity of the security countermeasure information are in mutual correspondence, security countermeasure information of the second communication device which is included in the notification information and appends the security countermeasure information to the security assurance information, and transmits the security assurance information to the second communication device, and, if there is a request from the first communication device for a judgment of the validity of the security assurance information, decrypts the security countermeasure information in the security assurance information, and judges the validity of the security assurance information based upon the security countermeasure information after decryption and the abrogation information.

16. A communication system according to claim 14, wherein:

the security assurance device further appends to the security assurance information, along with storing abrogation information in which security countermeasure information which specifies type of security countermeasure, identification information which identifies the type, and information which indicates the validity of the type are in mutual correspondence, the identification information in correspondence to the security countermeasure information for the second communication device which is included in the notification information and transmits to the second communication device, and, if there is a request from the first communication device for judgment of validity of the security assurance information, judge validity of the security assurance information based upon the identification information within the security assurance information and the abrogation information.

17. A communication system according to any one of claim 4 through claim 6, wherein:

the security countermeasure system includes at least one among a group consisting of an intrusion detection system, a virus detection system, a firewall, and a quarantine system.

18. A communication system according to claim 12, wherein:

the second communication device comprises a security countermeasure system;

the security assurance device makes an attack upon the second communication device based upon pattern information which specifies most up to date attack pattern;

the security countermeasure system detects the attack by the security assurance device, based upon the pattern information which the security countermeasure system possesses in advance;

the second communication device transmits attack detection information which specifies that an attack is detected by the security countermeasure system to the security assurance device; and the security assurance device receives the attack detection information, and, based upon the attack detection information and the pattern information, verifies security during communication with the second communication device, and, if security during communication with the second communication device is confirmed, appends the signature information to the security assurance information, and transmits to the second communication device.

19. A communication system according to claim 12, wherein:
the second communication device transmits to the security assurance device the security assurance information which proves security during communication and which includes information in which tags for recognition is appended to notification information that is for notifying security of the second communication device during communication; and
the security assurance device recognizes, upon receipt of the security assurance information, the notification information based upon the tags, verifies security during communication with the second communication device based upon the notification information, and, if security during communication is confirmed, appends signature information to the security assurance information, and transmits the security assurance information to the second communication device.

20. A communication system according to claim 12, wherein:
the second communication device transmits to the security assurance device the security assurance information which includes state information which specifies status of a security countermeasure system possessed by the second communication device;
the security assurance device verifies, upon receipt of the security assurance information, security during communication with the second communication device based upon the state information which is included in the security assurance information, and, if security during communication is confirmed, appends signature information to the security assurance information, and transmits the security assurance information to the second communication device; and
a means for checking status of the security countermeasure system is comprised, within the second communication device, upon an internal security chip which has anti-tampering characteristic.

21. A communication system according to claim 12, wherein:
the second communication device transmits to the security assurance device the security assurance information which includes state information indicating the status of a security countermeasure system which the second communication device possesses;
the security assurance device verifies, upon receipt of the security assurance information, security during communication with the second communication device based upon the state information which is included in the security assurance information, and, if security during communication is confirmed, appends signature information to the security assurance information, and transmits the security assurance information to the second communication device; and
in the second communication device, a hash value means for checking status of the security countermeasure system is stored within a security chip which has an anti-tampering characteristic.

22. A communication system according to claim 16, wherein:

in the abrogation information, a plurality of the identification information which are different are linked to the type which is same one.

23. A communication system according to claim 16, wherein:
in the abrogation information, the types and the identification numbers which identify the types are set in mutual correspondence to one another, and, when appending the identification numbers, the identification numbers are appended so that all the types, which are in correspondence to all identification numbers lower than an abrogated identification number which is appended to the type which has been abrogated, are in the state of being abrogated.

24. A security assurance device included in a communication system which comprises a first communication device, and a second communication device which processes communication with the first communication device according to a connection request from the first communication device, the security assurance device assuring security during communication with the second communication device, comprising:
a reception means which receives notification information which is transmitted by the second communication device, the notification information including a security level of the second communication device;
a verification means which verifies the security level of the second communication device during communication with the second communication device based upon the notification information;
an attestation information generation means which generates, if the security level of the second communication device during communication with the second communication device is confirmed by the verification means, security assurance information which proves security during communication; and
a transmission means which transmits the security assurance information to the second communication device.

25. A security assurance device according to claim 24, wherein:
the security assurance device processes bi-directional authentication with the second communication device, and, after the bi-directional authentication, transmits actuation information for controlling and operating the second communication device to the second communication device, and, based upon the actuation information, along with receiving the notification information from the second communication device which has created the notification information, verifies the security during communication of the second communication device, based upon the notification information.

26. A security assurance device according to claim 24, wherein:
the security assurance device processes bi-directional authentication with the second communication device, and, after the bi-directional authentication, along with receiving the notification information from the second communication device which has created the notification information, verifies security during communication with the second communication device, based upon the notification information.

27. A security assurance device according to claim 24, further comprising:
an attack generation means which generates an attack packet based upon pattern information which specifies most up to date attack pattern, wherein:
the transmission means transmits the attack packet to the second communication device;

the reception means receives from the second communication device attack detection information which indicates an attack which is detected by a security countermeasure system provided to the second communication device, and which is based upon the attack packet; and the verification means verifies the security during communication with the second communication device, based upon the attack detection information and the pattern information instead of the notification information.

28. A security assurance device according to claim 24, wherein:

the notification information includes information which specifies the fact that the second communication device is monitoring communication with a security countermeasure system.

29. A security assurance device according to claim 24, wherein:

the reception means further receives recognizability attestation information, transmitted by the second communication device, which proves recognizability of the second communication device;

the verification means further verifies the recognizability of the second communication device based upon the recognizability attestation information; and the attestation information generation means generates the security assurance information, if recognizability and security during communication of the second communication device with the verification means are confirmed.

30. A security assurance device according to claim 24, wherein:

to the notification information which is transmitted by the second communication device, a tag is appended for identification; and the attestation information generation means identifies the notification information based upon the tag, verifies security during communication with the second communication device based upon the notification information, and creates the security assurance information if security during communication is confirmed.

31. A security assurance device included in a communication system which comprises a first communication device, and a second communication device which performs communication with the first communication device according to a connection request from the first communication device, the security assurance device assuring security during communication with the second communication device, comprising:

a reception means which receives security assurance information which is transmitted by the second communication device, the security assurance information including a security level of the second communication device;

a signature information appending means which appends signature information to the security assurance information; and a transmission means which transmits the security assurance information to which the signature information is appended, to the second communication device.

32. A security assurance device according to claim 24 or claim 31, further comprising:

a validity determination means which distinguishes the validity of the security assurance information, after receiving a request to distinguish the validity of the security assurance information from the first communication device.

33. A security assurance device according to claim 24 or claim 31, wherein:

the security assurance information includes at least one of a group consisting of information which specifies the second communication device, information which specifies the security assurance device, information which specifies when the security assurance information was created, information which specifies the period of validity of the security assurance information, various information which relates to an algorithm for generating the security assurance information, information which specifies that the second communication device is monitoring communication with a security countermeasure system, information which specifies the security countermeasure system, and information which specifies a monitoring policy.

34. A security assurance device according to one of claim 27 or claim 28, wherein:

the security countermeasure system includes at least one of a group consisting of an intrusion detection system, a virus detection system, a firewall, and a quarantine system.

35. A security assurance device according to claim 31, further comprising an attack generation means which generates an attack packet based upon pattern information which specifies most up to date attack pattern, wherein:

the transmission means transmits the attack packet to the second communication device;

the reception means receives from the second communication device attack detection information which indicates an attack which is detected by a security countermeasure system comprised by the second communication device, and which has been based upon the attack packet; and the verification means verifies the security during communication of the second communication device, based upon, instead of the notification information, the attack detection information and the pattern information, and, if security during communication of the second communication device is confirmed, appends the signature information to the security assurance information, and transmits to the second communication device.

36. A security assurance device according to claim 32, further comprising a storage means which stores abrogation information in which security countermeasure information which specifies the type of security countermeasure information and information which indicates the validity of the security countermeasure information are in mutual correspondence, wherein:

the attestation information generation means further encrypts security countermeasure information of the second communication device which is included in the notification information, and appends to the security assurance information; and the validity determination means further decrypts, if there is a request from the first communication device for a judgment of validity of the security assurance information, the security countermeasure information in the security assurance information, and judges validity of the security assurance information based upon the security countermeasure information after decryption and the abrogation information.

37. A security assurance device according to claim 32, wherein:

the security assurance device further comprises a storage means which stores abrogation information in which security countermeasure information which specifies the type of security countermeasure, identification information which identifies the type, and information which specifies the validity of the type are in mutual correspondence;

the attestation information generation means further appends, to the security assurance information, the identification information in correspondence to security countermeasure information for the second communication device which is included in the notification information; and the validity determination means further judges, if there is a request from the first communication device for judgment of validity of the security assurance information, validity of the security assurance information based upon the identification information within the security assurance information and the abrogation information.

38. A security assurance device according to claim 37, wherein:

in the abrogation information, a plurality of the identification information which are different are set in correspondence to the type which is same one.

39. A security assurance device according to claim 37, wherein:

in the abrogation information, the types and the identification numbers which identify the types are set in mutual correspondence to one another, and, when appending the identification numbers, the identification numbers are appended so that all the types, which are in correspondence to all identification numbers lower than an abrogated identification number which is appended to the type which has been abrogated, are in the state of being abrogated.

* * * * *